US007973755B2

(12) United States Patent
Morita et al.

(10) Patent No.: US 7,973,755 B2
(45) **Date of Patent: *Jul. 5, 2011**

(54) DATA DRIVER AND ELECTRO-OPTICAL DEVICE

(75) Inventors: Akira Morita, Suwa (JP); Yuichi Toriumi, Chino (JP)

(73) Assignee: Seiko Epson Corporation, Tokyo (JP)

(*) Notice: Subject to any disclaimer, the term of this patent is extended or adjusted under 35 U.S.C. 154(b) by 1002 days.

This patent is subject to a terminal disclaimer.

(21) Appl. No.: 11/882,841

(22) Filed: Aug. 6, 2007

(65) Prior Publication Data

US 2007/0296677 A1 Dec. 27, 2007

Related U.S. Application Data

(63) Continuation of application No. 10/834,036, filed on Apr. 29, 2004, now Pat. No. 7,259,741.

(30) Foreign Application Priority Data

May 12, 2003 (JP) ................................ 2003-133141

(51) Int. Cl.
*G09G 3/36* (2006.01)
*G09G 5/00* (2006.01)
*H04N 3/14* (2006.01)

(52) U.S. Cl. ................ 345/98; 345/89; 345/92; 345/99; 345/100; 345/103; 345/204; 345/690; 348/793

(58) Field of Classification Search .................... 345/89, 345/92, 98, 99, 100, 103, 204, 690; 348/793
See application file for complete search history.

(56) References Cited

U.S. PATENT DOCUMENTS

| | | | | |
|---|---|---|---|---|
| 5,822,026 | A | 10/1998 | Matsuo | |
| 6,980,187 | B2 | 12/2005 | Toriumi | |
| 7,030,869 | B2 | 4/2006 | Morita | |
| 7,173,596 | B2 | 2/2007 | Toriumi et al. | |
| 7,180,495 | B1 | 2/2007 | Matsueda | |
| 7,199,779 | B2 | 4/2007 | Toriumi et al. | |
| 7,206,004 | B2 | 4/2007 | Toriumi et al. | |
| 7,259,741 | B2 * | 8/2007 | Morita et al. | 345/98 |
| 7,262,757 | B2 * | 8/2007 | Morita et al. | 345/99 |
| 7,375,716 | B2 * | 5/2008 | Toriumi et al. | 345/99 |
| 2004/0164945 | A1 | 8/2004 | Toriumi et al. | |

(Continued)

FOREIGN PATENT DOCUMENTS

JP A 03-285479 12/1991

(Continued)

*Primary Examiner* — My-Chau T Tran
(74) *Attorney, Agent, or Firm* — Oliff & Berridge, PLC

(57) ABSTRACT

A data driver drives comb-tooth distributed data lines of an electro-optical device in units of a predetermined number of data lines. The data driver includes first and second divided gray-scale buses, a gray-scale bus to which gray-scale data is supplied corresponding to an arrangement order of each of the data lines, a gray-scale data distribution circuit which distributes and outputs the gray-scale data supplied to the gray-scale bus to the first and second divided gray-scale buses, a first driver circuit which drives the data lines belonging to a first group among the data lines based on the gray-scale data output to the first divided gray-scale bus by the gray-scale data distribution circuit, and a second driver circuit which drives the data lines belonging to a second group among the data lines based on the gray-scale data output to the second divided gray-scale bus by the gray-scale data distribution circuit.

17 Claims, 17 Drawing Sheets

U.S. PATENT DOCUMENTS

| | | | |
|---|---|---|---|
| 2004/0212631 | A1 | 10/2004 | Toriumi et al. |
| 2004/0227744 | A1 | 11/2004 | Toriumi et al. |
| 2004/0233184 | A1 | 11/2004 | Toriumi et al. |
| 2004/0233227 | A1 | 11/2004 | Toriumi et al. |
| 2004/0239603 | A1 | 12/2004 | Toriumi et al. |
| 2005/0001803 | A1 | 1/2005 | Morita et al. |

FOREIGN PATENT DOCUMENTS

| | | |
|---|---|---|
| JP | A 07-129125 | 5/1995 |
| JP | A 07-284116 | 10/1995 |
| JP | A 2001-051656 | 2/2001 |
| JP | A 2002-014657 | 1/2002 |
| JP | A 2002-156654 | 5/2002 |

* cited by examiner

DATA DRIVER AND ELECTRO-OPTICAL DEVICE

This is a Continuation of application Ser. No. 10/834,036 filed Apr. 29, 2004, now U.S. Pat. No. 7,259,741, which claims priority from Japanese Patent Application No. 2003-133141, filed on May 12, 2003. The disclosure of the prior applications is hereby incorporated by reference herein in its entirety.

BACKGROUND OF THE INVENTION

The present invention relates to a data driver and an electro-optical device.

A display panel (display device in a broad sense) represented by a liquid crystal display (LCD) panel is mounted on portable telephones or personal digital assistants (PDAs). In particular, the LCD panel realizes a reduction of size, power consumption, and cost in comparison with other display panels, and is mounted on various electronic instruments.

An LCD panel is required to have a size equal to or greater than a certain size taking visibility of an image to be displayed into consideration. On the other hand, there has been a demand that the mounting area of the LCD panel be as small as possible when the LCD panel is mounted on an electronic instrument.

As an LCD panel which can reduce the mounting area, a so-called comb-tooth distributed LCD panel has been known.

BRIEF SUMMARY OF THE INVENTION

One aspect of the present invention relates to a data driver which drives a plurality of data lines of an electro-optical device which includes a plurality of scan lines, the data lines and a plurality of pixels, the data lines being comb-tooth distributed in units of a predetermined number of the data lines, the data driver including:

first and second divided gray-scale buses;

a gray-scale bus to which gray-scale data is supplied corresponding to an arrangement order of each of the data lines;

a gray-scale data distribution circuit which distributes and outputs the gray-scale data supplied to the gray-scale bus to the first and second divided gray-scale buses;

a first driver circuit which drives the data lines belonging to a first group among the data lines based on the gray-scale data output to the first divided gray-scale bus by the gray-scale data distribution circuit; and a second driver circuit which drives the data lines belonging to a second group among the data lines based on the gray-scale data output to the second divided gray-scale bus by the gray-scale data distribution circuit, wherein the gray-scale data distribution circuit alternately outputs the gray-scale data supplied to the gray-scale bus to the first and second divided gray-scale buses in units of the gray-scale data for the predetermined number of data lines.

Another aspect of the present invention relates to an electro-optical device including:

a plurality of scan lines;

a plurality of data lines which are comb-tooth distributed in units of a predetermined number of the data lines;

a plurality of pixels;

the above-described data driver which drives the data lines; and a scan driver which scans the scan lines.

A further aspect of the present invention relates to an electro-optical device including:

a display panel which includes a plurality of scan lines, a plurality of data lines which are comb-tooth distributed in units of a predetermined number of the data lines; and a plurality of pixels;

the above-described data driver which drives the data lines; and a scan driver which scans the scan lines.

DETAILED DESCRIPTION OF THE EMBODIMENT

Embodiments of the present invention are described below. Note that the embodiments described hereunder do not in any way limit the scope of the invention defined by the claims laid out herein. Note also that all of the elements described below should not be taken as essential requirements for the present invention.

In order to reduce the mounting area of the LCD panel, it is effective to reduce the interconnect region between the LCD panel and a scan driver which drives scan lines of the LCD panel, or to reduce the interconnect region between the LCD panel and a data driver which drives data lines of the LCD panel.

In the case where a data driver drives data lines of a comb-tooth distributed LCD panel from opposite sides of the LCD panel, it is necessary to change the order of gray-scale data which is supplied corresponding to the arrangement order of the data lines in a conventional LCD panel.

Therefore, since a conventional data driver cannot change the order of the gray-scale data supplied corresponding to the data lines, a dedicated data scramble IC must be added when driving the comb-tooth distributed LCD panel using a conventional data driver.

Moreover, if the gray-scale data is output to a gray-scale bus with a large interconnect length for capturing the gray-scale data, it is necessary to provide a buffer with high drive capability. Furthermore, power consumption increases due to an increase in shoot-through current accompanying switching of the gray-scale data.

According to the following embodiments, a data driver and an electro-optical device capable of reducing power consumption in driving a display panel in which data lines are comb-tooth distributed can be provided.

The embodiments of the present invention are described below in detail with reference to the drawings.

1. Electro-Optical Device

Figure 1:
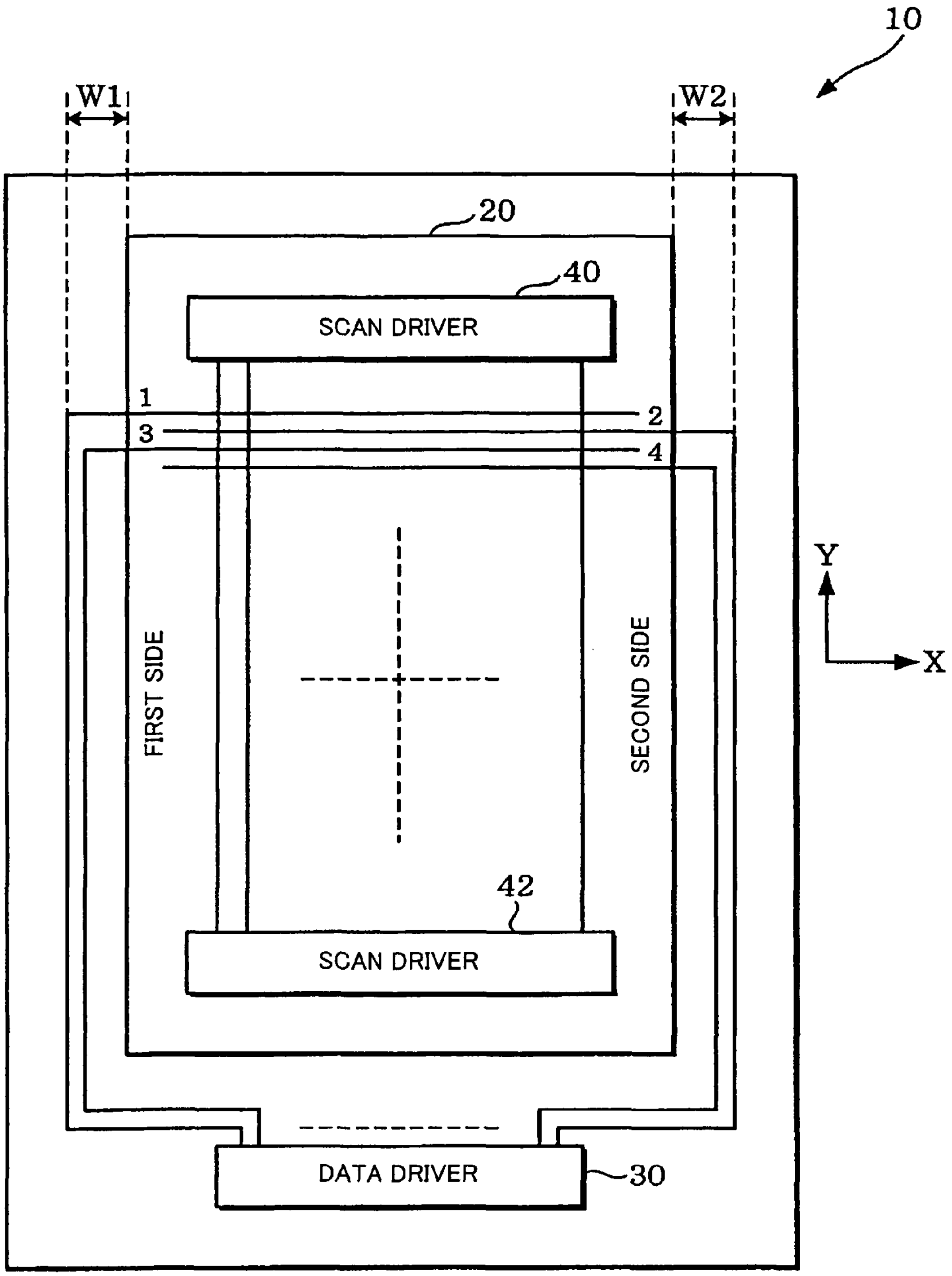
FIG. 1 is a block diagram schematically showing a configuration of an electro-optical device.

FIG. 1 shows an outline of a configuration of an electro-optical device in this embodiment. FIG. 1 shows a liquid crystal device as an example of an electro-optical device. A liquid crystal device may be incorporated in various electronic instruments such as a portable telephone, portable information instrument (PDA or the like), digital camera, projector, portable audio player, mass storage device, video camera, electronic notebook, or global positioning system (GPS).

A liquid crystal device 10 includes an LCD panel 20 (display panel in a broad sense; electro-optical device in a broader sense), a data driver 30 (source driver), and scan drivers 40 and 42 (gate drivers).

The liquid crystal device 10 does not necessarily include all of these circuit blocks. The liquid crystal device 10 may have a configuration in which at least one of the circuit blocks is omitted.

The LCD panel 20 includes a plurality of scan lines (gate lines), a plurality of data lines (source lines) which intersect the scan lines, and a plurality of pixels, each of the pixels being specified by one of the scan lines and one of the data lines. In the case where one pixel consists of three color components of RGB, one pixel consists of three dots, one dot each for red, green, and blue. The dot may be referred to as an element point which makes up each pixel. The data lines according to one pixel may be referred to as data lines in the number of color components which make up one pixel. The following description is mainly given on the assumption that one pixel consists of one dot for convenience of description.

Each pixel includes a thin film transistor (hereinafter abbreviated as "TFT") (switching device), and a pixel electrode. The TFT is connected with the data line, and the pixel electrode is connected with the TFT.

The LCD panel 20 is formed on a panel substrate such as a glass substrate. A plurality of scan lines, arranged in the X direction shown in FIG. 1 and extending in the Y direction, and a plurality of data lines, arranged in the Y direction and extending in the X direction, are disposed on the panel substrate. In the LCD panel 20, the data lines are comb-tooth distributed. In FIG. 1, the data lines are comb-tooth distributed so that the data lines are driven from a first side of the LCD panel 20 and a second side opposite to the first side. The comb-tooth distribution may be referred to as a distribution in which the data lines are alternately distributed inward from opposite sides (first and second sides of the LCD panel 20) in the shape of comb teeth in units of a predetermined number of data lines (one or a plurality of data lines).

Figure 2:
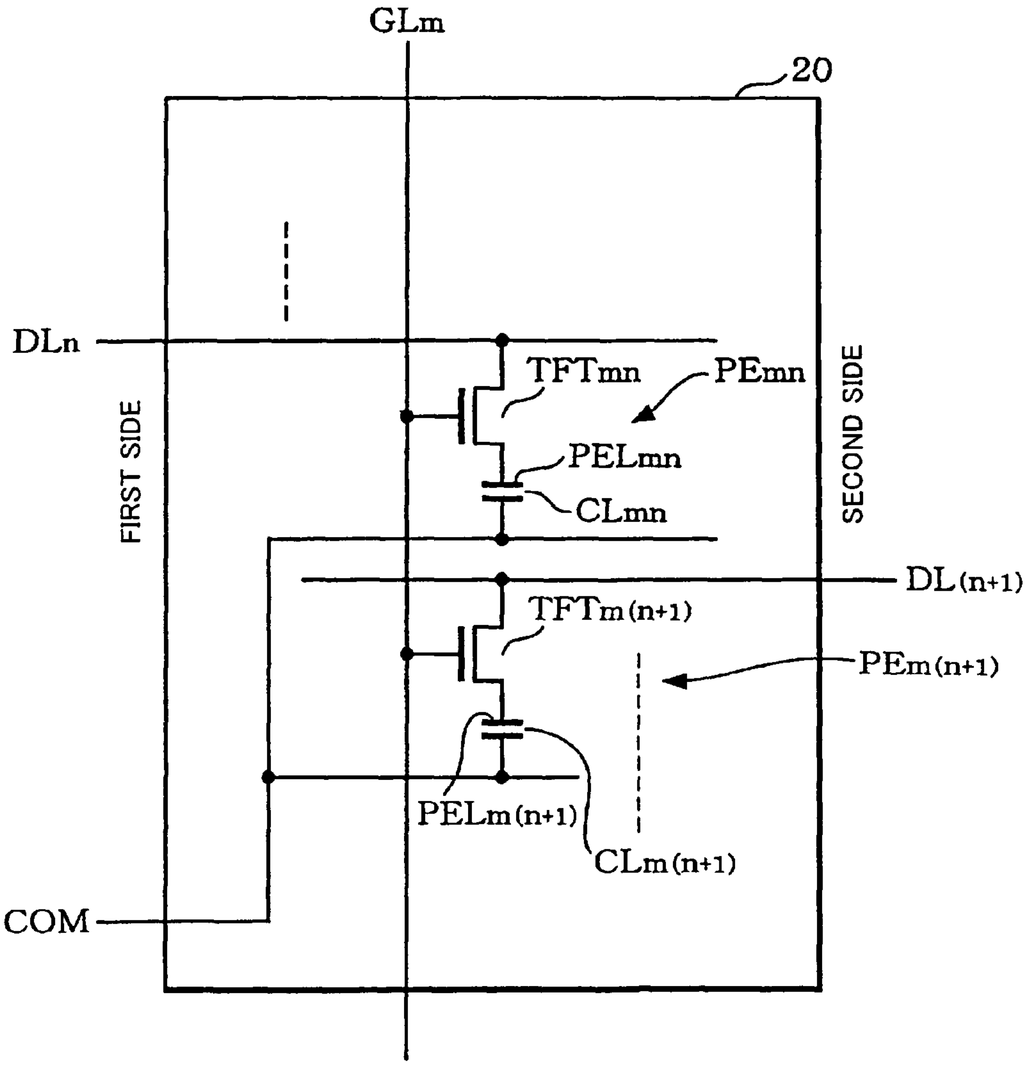
FIG. 2 is a schematic diagram of a configuration of a pixel.

FIG. 2 schematically shows a configuration of the pixel. In FIG. 2, one pixel consists of one dot. A pixel PEmn is provided at a position corresponding to the intersecting point of the scan line GLm ($1 \leqq m \leqq M$, M and m are integers) and the data line DLn ($1 \leqq n \leqq N$, N and n are integers). The pixel PEmn includes the thin film transistor TFTmn and the pixel electrode PELmn.

A gate electrode of the thin film transistor TFTmn is connected with the scan line GLm. A source electrode of the thin film transistor TFTmn is connected with the data line DLn. A drain electrode of the thin film transistor TFTmn is connected with the pixel electrode PELmn. A liquid crystal capacitor CLmn is formed between the pixel electrode and a common electrode COM which faces the pixel electrode through a liquid crystal element (electro-optical material in a broad sense). A storage capacitor may be formed in parallel with the liquid crystal capacitor CLmn. Transmissivity of the pixel changes corresponding to the voltage applied between the pixel electrode and the common electrode COM. A voltage VCOM supplied to the common electrode COM is generated by a power supply circuit (not shown).

The LCD panel 20 is formed by attaching a first substrate on which the pixel electrode and the TFT are formed to a second substrate on which the common electrode is formed, and sealing a liquid crystal as an electro-optical material between the two substrates.

The scan line is scanned by the scan drivers 40 and 42. In FIG. 1, one scan line is driven by the scan drivers 40 and 42 at the same time.

The data line is driven by the data driver 30. The data lines of the LCD panel 20 include the data lines belonging to first and second groups (or, the data lines of the LCD panel 20 belong to either the first or second group).

The data lines belonging to the first group are driven by the data driver 30 from the first side of the LCD panel 20. In more detail, the data lines belonging to the first group are connected with data output sections of the data driver 30 on the first side of the LCD panel 20. In FIG. 1, the data lines DL1, DL3, DL5, . . . , and DL(2p−1) (p is a natural number) belong to the first group.

The data lines belonging to the second group are driven by the data driver 30 from the second side of the LCD panel 20 opposite to the first side. In more detail, the data lines belonging to the second group are connected with the data output sections of the data driver 30 on the second side of the LCD panel 20. In FIG. 1, the data lines DL2, DL4, DL6, . . . , and DL2*p* belong to the second group. The first and second sides of the LCD panel 20 face each other in the direction in which the data lines extend.

As described above, in the LCD panel 20, the data lines are comb-tooth distributed so that the data lines in the number of color components of each pixel disposed corresponding to the adjacent pixels connected with the selected scan line are driven from opposite directions.

In more detail, in the LCD panel 20 in which the data lines are comb-tooth distributed as shown in FIG. 2, in the case where the data lines DLn and DL(n+1) are disposed corresponding to the adjacent pixels connected with the selected scan line GLm, the data line DLn is driven by the data driver 30 from the first side of the LCD panel 20, and the data line DL(n+1) is driven by the data driver 30 from the second side of the LCD panel 20.

The above description also applies to the case where the data lines corresponding to RGB color components are disposed corresponding to one pixel. In this case, if the data line DLn consisting of a set of three color component data lines (Rn, Gn, Bn) and the data line DL(n+1) consisting of a set of three color component data lines (R(n+1), G(n+1), B(n+1)) are disposed corresponding to the adjacent pixels connected with the selected scan line GLm, the data line DLn is driven by the data driver 30 from the first side of the LCD panel 20, and the data line DL(n+1) is driven by the data driver 30 from the second side of the LCD panel 20.

The data driver 30 drives the data lines DL1 to DLN of the LCD panel 20 based on gray-scale data for one horizontal scanning period supplied in units of horizontal scanning periods. In more detail, the data driver 30 drives at least one of the data lines DL1 to DLN based on the gray-scale data.

The scan drivers 40 and 42 scan the scan lines GL1 to GLM of the LCD panel 20. In more detail, the scan drivers 40 and 42 sequentially select the scan lines GL1 to GLM within one vertical scanning period, and drive the selected scan line.

The data driver 30 and the scan drivers 40 and 42 are controlled by a controller (not shown). The controller outputs control signals to the data driver 30, the scan drivers 40 and 42, and the power supply circuit according to the contents set by a host such as a central processing unit (CPU). In more detail, the controller supplies an operation mode setting and a horizontal synchronization signal or a vertical synchronization signal generated therein to the data driver 30 and the scan drivers 40 and 42, for example. The horizontal synchronization signal specifies the horizontal scanning period. The vertical synchronization signal specifies the vertical scanning period. The controller controls the power supply circuit relating to polarity reversal timing of the voltage VCOM applied to the common electrode COM.

The power supply circuit generates various voltages for the LCD panel 20 and the voltage VCOM applied to the common electrode COM based on a reference voltage supplied from the outside.

In FIG. 1, the liquid crystal device 10 may include the controller, or the controller may be provided outside the liquid crystal device 10. The host (not shown) may be included in the liquid crystal device 10 together with the controller.

At least one of the scan drivers 40 and 42, the controller, and the power supply circuit may be included in the data driver 30.

At least a part or the entirety of the data driver 30, the scan drivers 40 and 42, the controller, and the power supply circuit may be formed on the LCD panel 20. For example, the data driver 30 and the scan drivers 40 and 42 may be formed on the LCD panel 20. In this case, the LCD panel 20 may be called an electro-optical device. The LCD panel 20 may include a plurality of data lines, a plurality of scan lines, a plurality of pixels, each of the pixels being specified by one of the data lines and one of the scan lines, a data driver which drives the data lines, and a scan driver which scans the scan lines. The pixels are formed in a pixel formation region of the LCD panel 20.

The advantages of the comb-tooth distributed LCD panel are described below.

Figure 3:
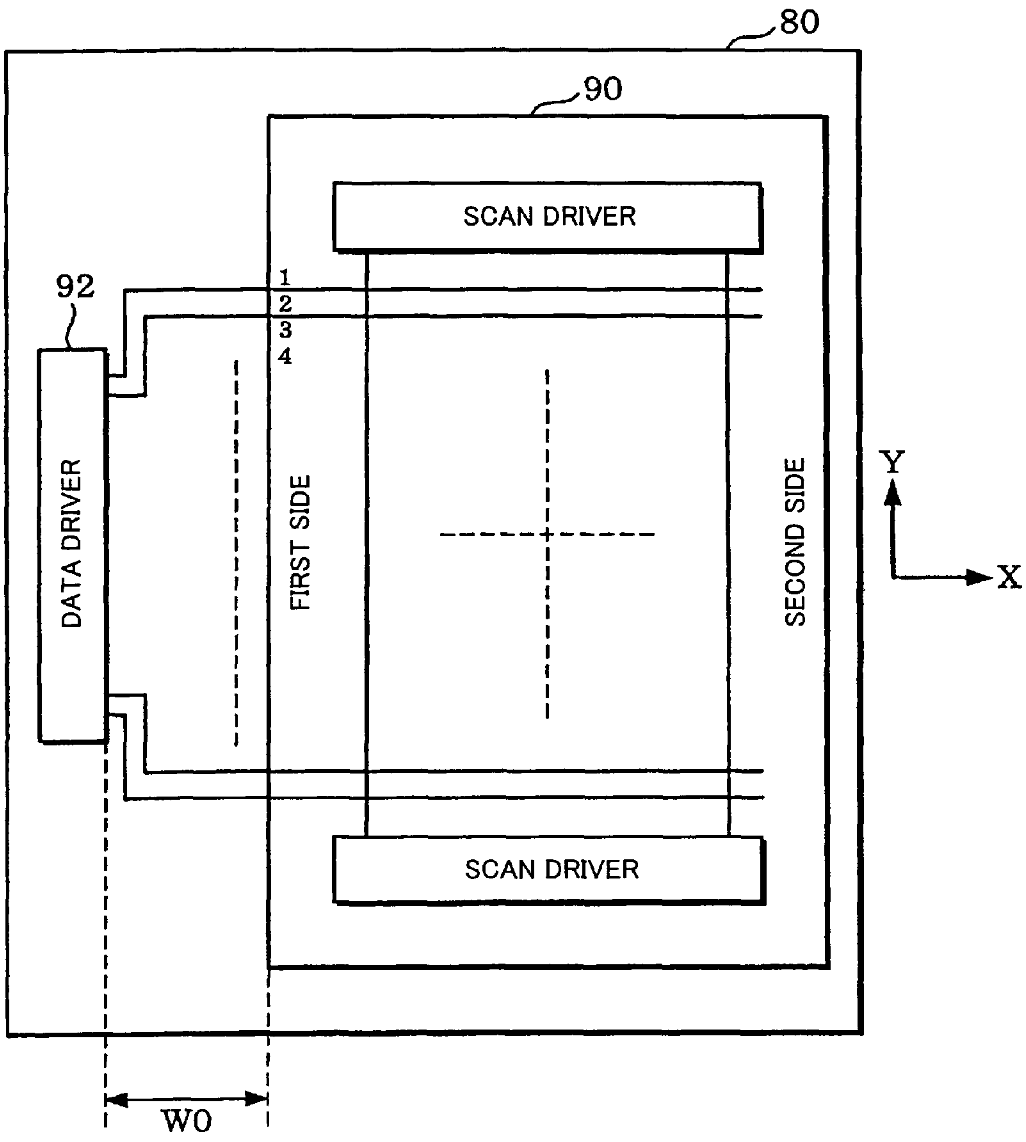
FIG. 3 is a block diagram schematically showing a configuration of an electro-optical device including an LCD panel which is not comb-tooth distributed.

FIG. 3 schematically shows a configuration of an electro-optical device including an LCD panel which is not comb-tooth distributed. An electro-optical device 80 shown in FIG. 3 includes an LCD panel 90 which is not comb-tooth distributed. In the LCD panel 90, the data lines are driven by a data driver 92 from the first side. Therefore, an interconnect region is necessary for connecting the data output sections of the data driver 92 with the data lines of the LCD panel 90. If the lengths of the first and second sides of the LCD panel 90 increase due to an increase in the number of data lines, it is necessary to bend each interconnect, whereby a width W0 is necessary for the interconnect region.

On the contrary, in the electro-optical device 10 shown in FIG. 1, only widths W1 and W2 which are smaller than the width W0 are respectively necessary on the first and second sides of the LCD panel 20.

Taking mounting on electronic instruments into consideration, it is disadvantageous that the length of the LCD panel (electro-optical device) be increased in the direction of the short side in comparison with the case where the length of the LCD panel is increased in the direction of the long side to some extent. This is undesirable from the viewpoint of the design due to an increase in the width of the frame of the display section of the electronic instrument, for example.

In FIG. 3, the length of the LCD panel is increased in the direction of the short side. On the contrary, the length of the LCD panel is increased in the direction of the long side in FIG. 1. Therefore, the widths of the interconnect regions on the first and second sides can be made narrow to almost an equal extent. In FIG. 1, the non-interconnect region in FIG. 3 can be reduced, whereby the mounting area can be reduced.

Figure 4:
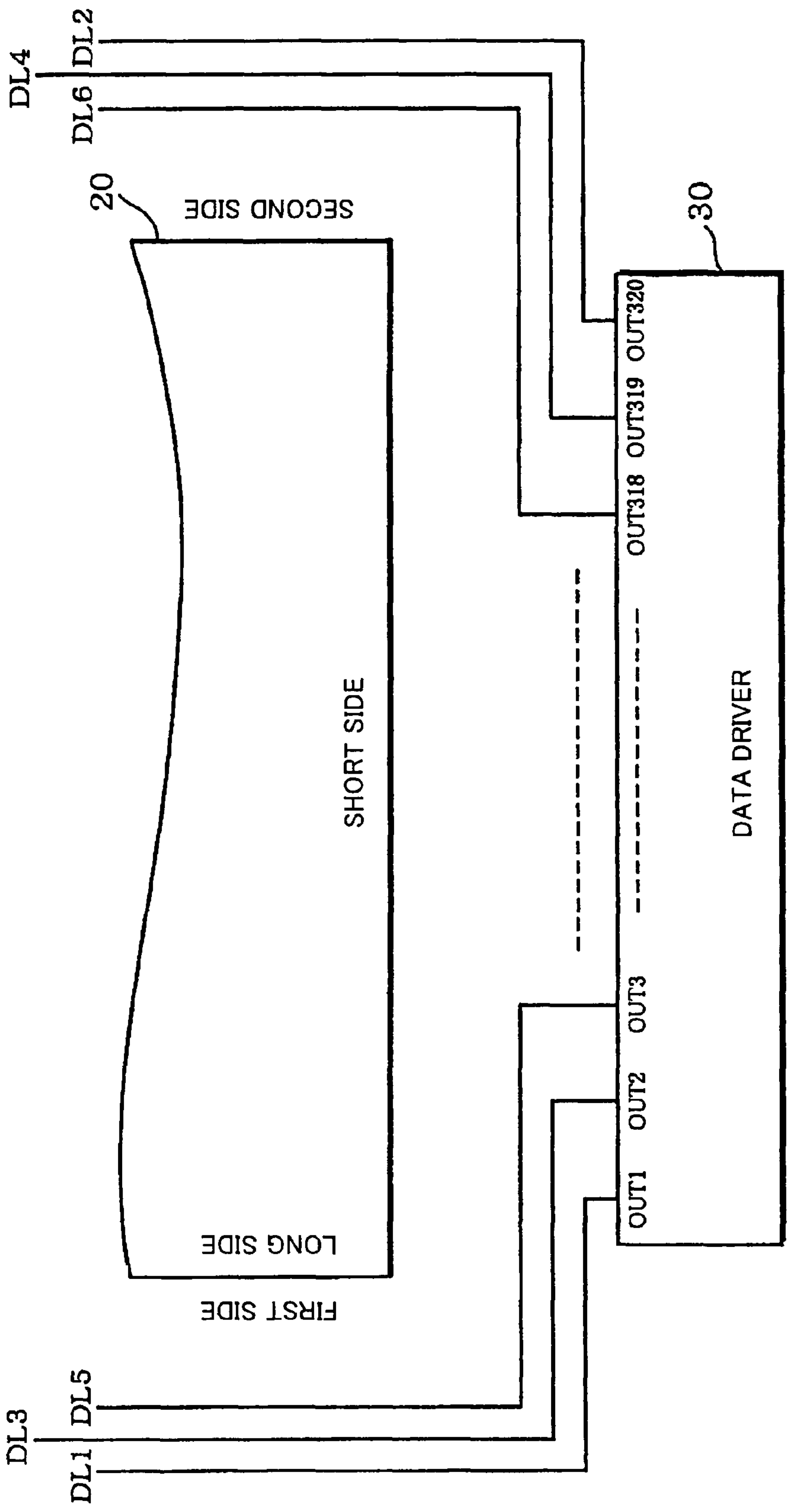
FIG. 4 is illustrative of an example of a data driver disposed along the short side of an LCD panel.

In the case where the arrangement order of the data output sections of the data driver 30 coincides with the arrangement order of the data lines of the LCD panel 20 (specifically, the arrangement order of the data output sections of the data driver 30 is the same as the arrangement order of the data lines of the LCD panel 20), interconnects which connect the data output sections with the data lines can be disposed from the first and second sides by disposing the data driver 30 along the short side of the LCD panel 20 as shown in FIG. 4, whereby the interconnects can be simplified and the interconnect region can be reduced.

However, in the data driver 30 which receives the gray-scale data output from a general-purpose controller corresponding to the arrangement order of the data lines, it is necessary to change the order of the received gray-scale data when driving the LCD panel 20.

The following description is given on the assumption that the data driver 30 includes data output sections OUT1 to OUT320, and the data output sections are arranged in the direction from the first side to the second side. The data output sections correspond to the data lines of the LCD panel 20.

Figure 5:
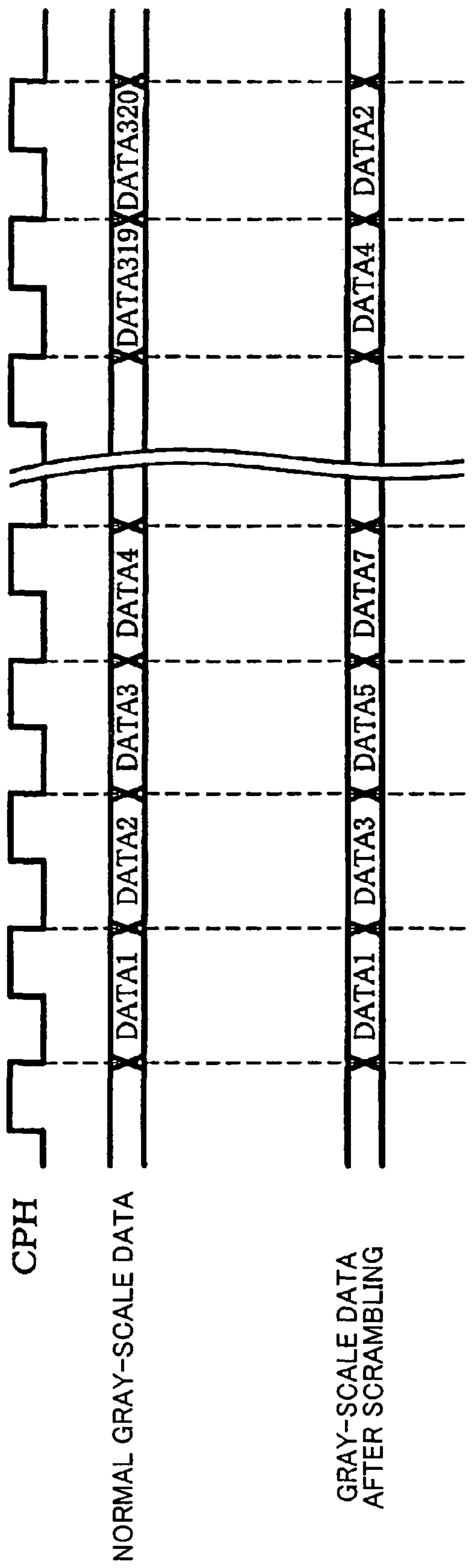
FIG. 5 is illustrative of the necessity of data scrambling for driving a comb-tooth distributed LCD panel.

A general-purpose controller supplies gray-scale data DATA1 to DATA320 respectively corresponding to the data lines DL1 to DL320 to the data driver 30 in synchronization with a reference clock signal CPH, as shown in FIG. 5. In the case where the data driver 30 drives the LCD panel which is not comb-tooth distributed as shown in FIG. 3, the data output section OUT1 is connected with the data line DL1, the data output section OUT2 is connected with the data line DL2, . . . , and the data output section OUT320 is connected with the data line DL320, whereby an image can be displayed without causing a problem. However, in the case where the data driver 30 drives the comb-tooth distributed LCD panel as shown in FIG. 1 or 4, the data output section OUT1 is connected with the data line DL1, the data output section OUT2 is connected with the data line DL3, . . . , and the data output section OUT320 is connected with the data line DL2. Therefore, a desired image cannot be displayed.

Therefore, it is necessary to change the arrangement of the gray-scale data as shown in FIG. 5 by performing scramble processing of changing the order of the gray-scale data. Therefore, in the case of driving the comb-tooth distributed LCD panel by using a data driver controlled by a general-purpose controller, a dedicated data scramble IC, which performs the scramble processing, must be added, whereby the mounting area inevitably increases.

The data driver 30 in this embodiment is capable of driving the comb-tooth distributed LCD panel based on the gray-scale data supplied from a general-purpose controller by using the configuration described below.

In this embodiment, the interconnect length of the gray-scale bus to which the gray-scale data is output for changing the arrangement order can be reduced, and the change cycle of the gray-scale data can be doubled (frequency can be halved). Therefore, the charge and discharge frequency of the gray-scale bus can be reduced, whereby power consumption can be reduced.

2. Data Driver

Figure 6:
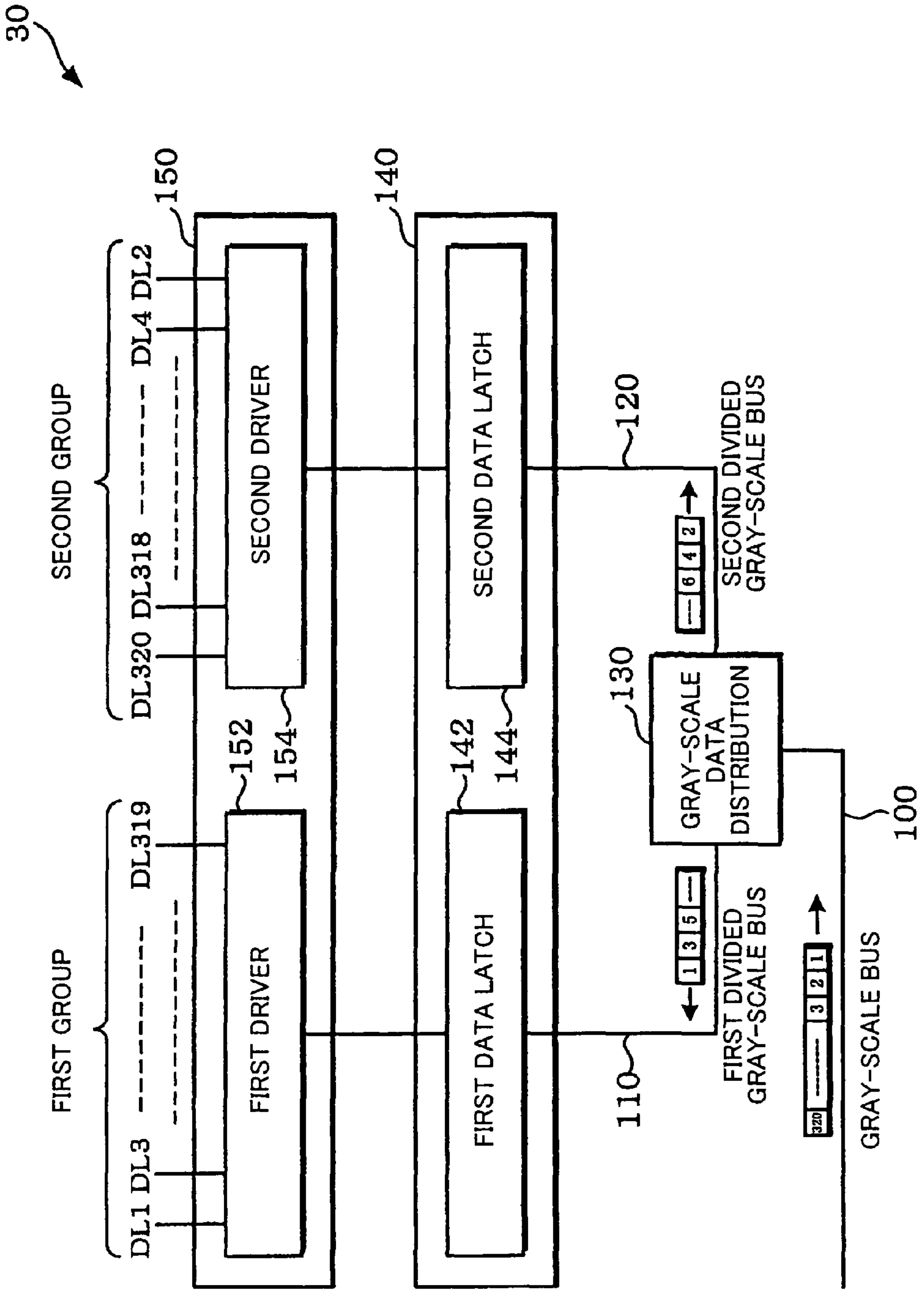
FIG. 6 is a diagram schematically showing a configuration of a data driver in an embodiment of the present invention.

FIG. 6 shows an outline of a configuration of the data driver 30. The data driver 30 includes a gray-scale bus 100, first and second divided gray-scale buses 110 and 120, a gray-scale data distribution circuit 130, a gray-scale data latch circuit 140, and a data line driver circuit 150.

The data line driver circuit 150 includes a plurality of data output sections disposed in the order corresponding to the arrangement order of the data lines of the LCD panel 20. Specifically, the data line driver circuit 150 includes a plurality of data output sections disposed in the arrangement order of the data lines of the LCD panel 20.

The data line driver circuit 150 includes first and second driver circuits 152 and 154. The first driver circuit 152 includes the data output sections which drive the data lines belonging to the first group among the data output sections. The second driver circuit 154 includes the data output sections which drive the data lines belonging to the second group among the data output sections. In FIG. 6, the first driver circuit 152 includes the data output sections which are connected with the data lines of the LCD panel 20 in the order of the data lines DL1, DL3, . . . , and DL319. The second driver circuit 154 includes the data output sections which are connected with the data lines of the LCD panel 20 in the order of the data lines DL320, DL318, . . . , DL4, and DL2.

As shown in FIG. 5, the gray-scale data is supplied to the gray-scale bus 100 in the arrangement order of the data lines (in the direction Y of the LCD panel 20 shown in FIG. 1). The gray-scale data distribution circuit 130 distributes and outputs the gray-scale data supplied to the gray-scale bus 100 to the first and second divided gray-scale buses 110 and 120. In more detail, in the case where the data lines are comb-tooth distributed in units of a predetermined number of data lines, the gray-scale data distribution circuit 130 alternately distributes and outputs the gray-scale data supplied to the gray-scale bus 100 to the first and second divided gray-scale buses 110 and 120 in units of the gray-scale data corresponding to the predetermined number of data lines. In the case where one pixel consists of one dot, the data lines of the LCD panel 20 are comb-tooth distributed in units of one data line, and the gray-scale data distribution circuit 130 alternately distributes the gray-scale data to the first and second divided gray-scale buses 110 and 120 in units of the gray-scale data corresponding to one data line (gray-scale data for one pixel). In the case where one pixel consists of three dots, the data lines of the LCD panel 20 are comb-tooth distributed in units of three data lines, and the gray-scale data distribution circuit 130 alternately distributes the gray-scale data to the first and second divided gray-scale buses 110 and 120 in units of gray-scale data corresponding to three data lines (gray-scale data for one pixel).

Therefore, the gray-scale data distribution circuit 130 outputs the gray-scale data DATA1, DATA3, . . . , and DATA319 corresponding to the data lines DL1, DL3, . . . , and DL319 to the first divided gray-scale bus 110 among the gray-scale data DATA1, DATA2, . . . , and DATA320 which is supplied to the gray-scale bus 100 and each of which is data for one pixel. The gray-scale data distribution circuit 130 outputs the gray-scale data DATA2, DATA4, . . . , and DATA320 corresponding to the data lines DL2, DL4, . . . , and DL320 to the second divided gray-scale bus 120 among the gray-scale data DATA1, DATA2, . . . , and DATA320 which is supplied to the gray-scale bus 100.

The first driver circuit 152 drives the data lines DL1, DL3, . . . , and DL319 belonging to the first group among the data lines of the LCD panel 20 based on the gray-scale data output to the first divided gray-scale bus 110. The second driver circuit 154 drives the data lines DL2, DL4, . . . , DL318, and DL320 belonging to the second group among the data lines of the LCD panel 20.

The gray-scale data latch circuit 140 of the data driver 30 may include first and second data latches 142 and 144. The first data latch 142 captures the gray-scale data output to the first divided gray-scale bus 110. The second data latch 144 captures the gray-scale data output to the second divided gray-scale bus 120. The first driver circuit 152 drives the data lines belonging to the first group based on the gray-scale data captured in the first data latch 142. The second driver circuit 154 drives the data lines belonging to the second group based on the gray-scale data captured in the second data latch 144.

The gray-scale data distribution circuit 130 preferably includes bus latches which latch the gray-scale data on the first and second divided gray-scale buses 110 and 120.

According to this configuration, the interconnect length of the gray-scale bus 100 can be reduced in the data driver 30. Moreover, since the interconnect lengths of the first and second divided gray-scale buses 110 and 120, which are additionally provided, can be reduced, drive capability of the buffer can be reduced. Furthermore, the frequency in the change in the gray-scale data output to the first and second divided gray-scale buses 110 and 120 can be halved in comparison with the frequency in the change in the gray-scale data output to the gray-scale bus 100, whereby power consumption can be reduced.

A more detailed configuration example of the data driver 30 is described below.

Figure 7:
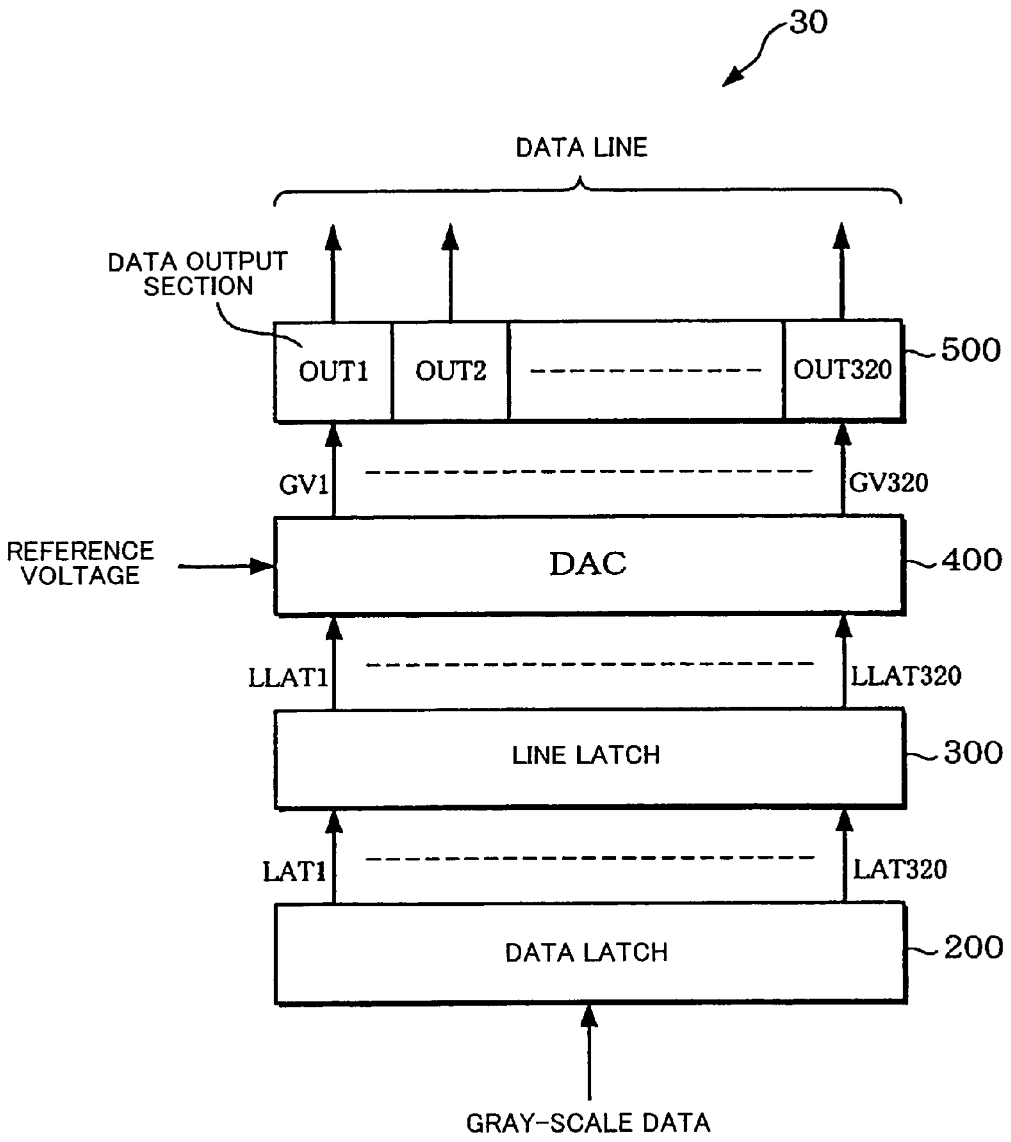
FIG. 7 is a block diagram of a configuration of a data driver.

FIG. 7 shows a block diagram of the configuration of the data driver 30. The data driver 30 includes a data latch 200, a line latch 300, a digital-to-analog converter (DAC) 400 (voltage select circuit in a broad sense), and a data line driver circuit 500. The data line driver circuit 150 shown in FIG. 6 corresponds to the data line driver circuit 500 shown in FIG. 7. The gray-scale data latch circuit 140 shown in FIG. 6 corresponds to the data latch 200 shown in FIG. 7. The gray-scale data distribution circuit 130 shown in FIG. 6 may be included in the data latch 200 shown in FIG. 7.

In FIG. 7, the data latch 200 captures the gray-scale data in one horizontal scanning cycle.

The line latch 300 latches the gray-scale data captured by the data latch 200 based on a horizontal synchronization signal HSYNC.

The DAC 400 outputs a drive voltage (gray-scale voltage) corresponding to the gray-scale data output from the line latch 300 selected from among a plurality of reference voltages corresponding to the gray-scale data in units of data lines. In more detail, the DAC 400 decodes the gray-scale data from the line latch 300, and selects one of the reference voltages based on the decoded result. The reference voltage selected by the DAC 400 is output to the data line driver circuit 500 as the drive voltage.

The data line driver circuit 500 includes 320 data output sections OUT1 to OUT320. The data line driver circuit 500 drives the data lines DL1 to DLN based on the drive voltage output from the DAC 400 through the data output sections OUT1 to OUT320. In the data line driver circuit 500, the data output sections (OUT1 to OUT320) are disposed corresponding to the arrangement order of the data lines, each of the data output sections driving the data line based on the gray-scale data (latch data) held in the line latch 300. The above description illustrates the case where the data line driver circuit 500 includes the 320 data output sections OUT1 to OUT320. However, the number of data output sections is not limited thereto.

In the data driver 30, latch data LAT1 captured by the data latch 200 is output to the line latch 300. The latch data LLAT1 latched by the line latch 300 is output to the DAC 400. The DAC 400 generates a drive voltage GV1 corresponding to the latch data LLAT1 output from the line latch 300. The data output section OUT1 of the data line driver circuit 500 drives the data line connected with the data output section OUT1 based on the drive voltage GV1 from the DAC 400.

As described above, the data driver 30 captures the gray-scale data in the data latch 200 in units of data output sections of the data line driver circuit 500. The latch data latched by the data latch 200 in units of data output sections may be in units of one pixel, a plurality of pixels, one dot, or a plurality of dots.

Figure 8:
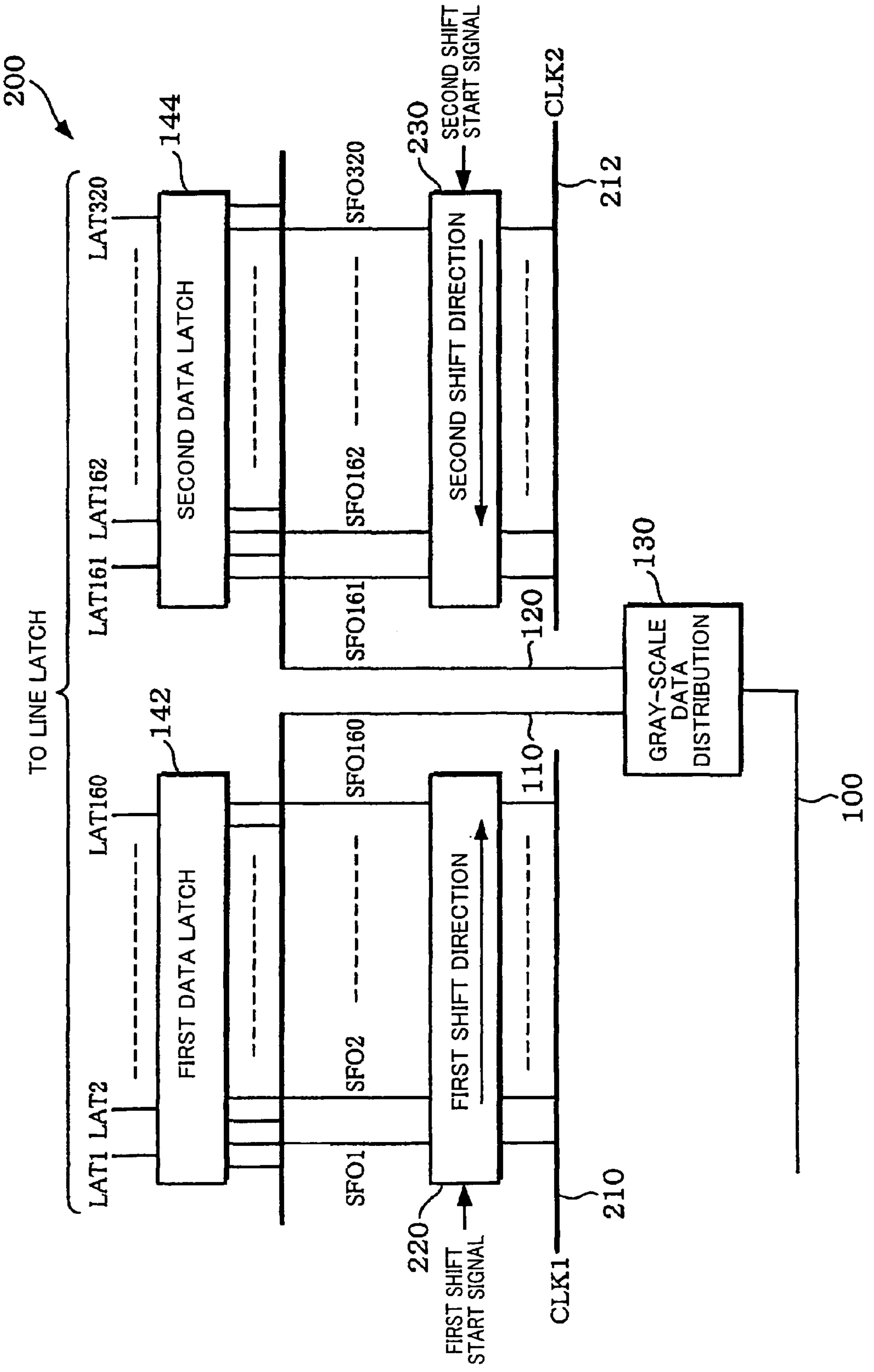
FIG. 8 is a block diagram of a configuration of a data latch of the data driver shown in FIG. 7.

FIG. 8 shows an outline of a configuration of the data latch 200 shown in FIG. 7. In FIG. 8, blocks the same as the blocks shown in FIG. 6 are indicated by the same symbols. Description of these blocks is appropriately omitted.

The data latch 200 includes the gray-scale bus 100, the first and second divided gray-scale buses 110 and 120, first and second clock lines 210 and 212, first and second shift registers 220 and 230, the first and second data latches 142 and 144, and the gray-scale data distribution circuit 130.

A first shift clock signal CLK1 is supplied to the first clock line 210. A second shift clock signal CLK2 is supplied to the second clock line 212.

The first shift register 220 includes a plurality of flip-flops. The first shift register 220 shifts a first shift start signal ST1 in a first shift direction based on the first shift clock signal CLK1, and outputs a shift output from each flip-flop. The first shift direction may be the direction from the first side to the second side of the LCD panel 20. Shift outputs SFO1 to SFO160 from the first shift register 220 are output to the first data latch 142.

Figure 9:
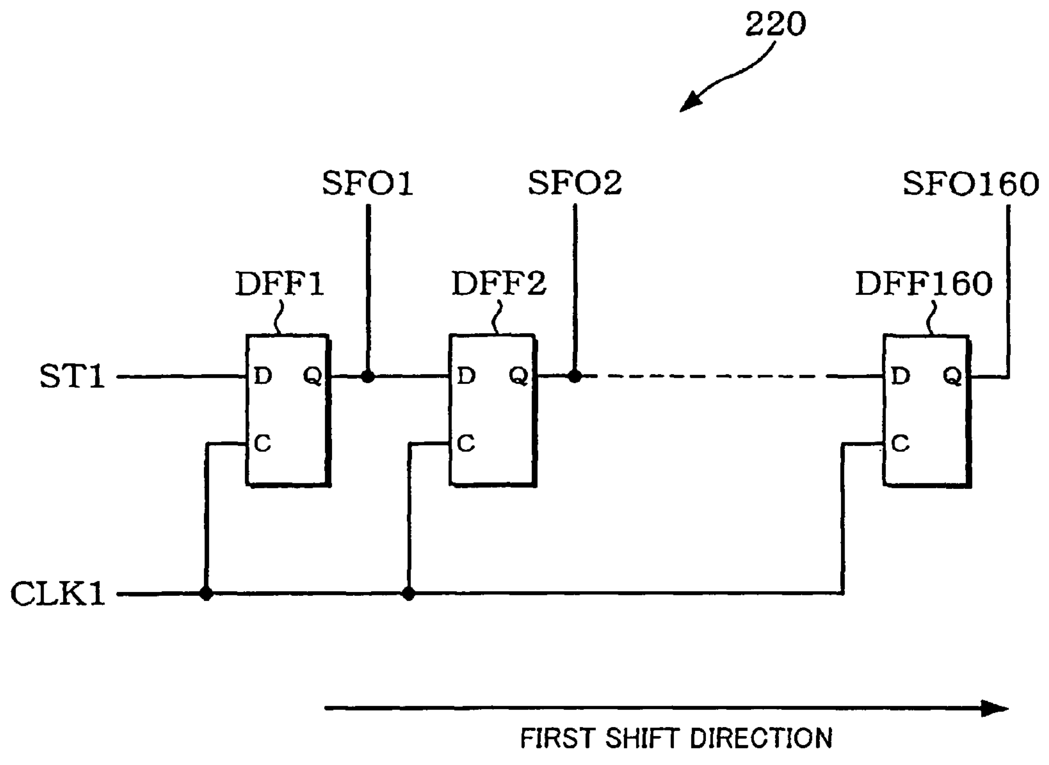
FIG. 9 is a circuit diagram showing a configuration example of a first shift register.

FIG. 9 shows a configuration example of the first shift register 220. In the first shift register 220, D flip-flops (hereinafter abbreviated as "DFF") DFF1 to DFF160 are connected in series so that the first shift start signal ST1 is shifted in the first shift direction. A Q terminal of the D flip-flop DFFk ($1 \leqq k \leqq 159$, k is a natural number) is connected with a D terminal of the D flip-flop DFF(k+1) in the subsequent stage. Each DFF captures and holds a signal input to the D terminal at the rising edge of a signal input to a C terminal, and outputs the held signal from the Q terminal as the shift output SFO.

In FIG. 8, the second shift register 230 includes a plurality of flip-flops. The second shift register 230 shifts a second shift start signal ST2 in the second shift direction opposite to the first direction based on the second shift clock signal CLK2, and outputs a shift output from each flip-flop. The second shift direction may be the direction from the second side to the first side of the LCD panel 20. Shift outputs SFO161 to SFO320 from the second shift register 230 are output to the second data latch 144.

Figure 10:
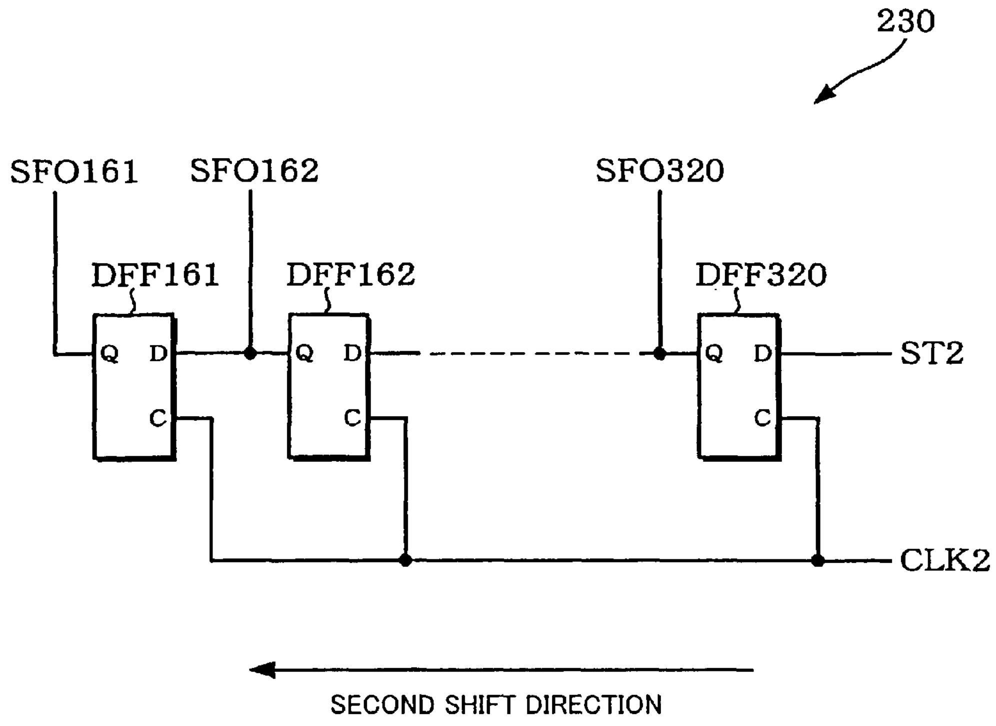
FIG. 10 is a circuit diagram showing a configuration example of a second shift register.

FIG. 10 shows a configuration example of the second shift register 230. In the second shift register 230, D flip-flops DFF320 to DFF161 are connected in series so that the second shift start signal ST2 is shifted in the second shift direction. A Q terminal of the D flip-flop DFFj ($162 \leqq j \leqq 320$, j is a natural number) is connected with a D terminal of the D flip-flop DFF(j−1) in the subsequent stage. Each DFF captures and holds a signal input to the D terminal at the rising edge of a signal input to a C terminal, and outputs the held signal from a Q terminal as the shift output SFO.

In FIG. 8, the first data latch 142 includes a plurality of flip-flops FF1 to FF160 (not shown), each of the flip-flops corresponding to one of the data output sections OUT1 to OUT160. The flip-flop FFi ($1 \leqq i \leqq 160$) holds the gray-scale data on the first divided gray-scale bus 110 based on the shift output SFOi from the first shift register 220. The gray-scale data held in the flip-flops of the first data latch 142 is output to the line latch 300 as the latch data LAT1 to LAT160.

The second data latch 144 includes a plurality of flip-flops (FF) FF161 to FF320 (not shown), each of the flip-flops corresponding to one of the data output sections OUT161 to OUT320. The flip-flop FFi ($161 \leqq i \leqq 320$) holds the gray-scale data on the second divided gray-scale bus 120 based on the shift output SFOi from the second shift register 230. The gray-scale data held in the flip-flops of the second data latch 144 is output to the line latch 300 as the latch data LAT161 to LAT320.

As described above, the first and second data latches 142 and 144 are capable of capturing the gray-scale data on the first and second divided gray-scale buses 110 and 120 based on the shift outputs which can be separately generated. This enables the frequency in the change in the data on the bus to which the gray-scale data is output to be approximately halved, and the latch data corresponding to each data output section to be captured in the data latch 200 by changing the arrangement order of the gray-scale data. Therefore, the data lines can be driven from the first side of the LCD panel 20 (electro-optical device) based on the data (LAT1 to LAT160) held in the flip-flops of the first data latch 142, and the data lines can be driven from the second side of the LCD panel 20 (electro-optical device) based on the data (LAT161 to LAT320) held in the flip-flops of the second data latch 144, whereby the comb-tooth distributed LCD panel 20 can be driven without using a data scramble IC.

The data driver 30 may change the shift direction using a shift direction signal SHL. In this case, the gray-scale data is captured in the shift direction specified by setting the shift direction signal SHL at an "H" level in FIGS. 8 to 10. Specifically, the gray-scale data DATA1 to DATA320 corresponding to the data output sections OUT1 to OUT320 is supplied to the gray-scale bus 100 in the order of the gray-scale data DATA1, DATA2, . . . , and DATA320. The gray-scale data distribution circuit 130 outputs the odd-numbered gray-scale data (1, 3, 5, . . . ) to the first divided gray-scale bus 110, and outputs the even-numbered gray-scale data (2, 4, 6, . . . ) to the second divided gray-scale bus 120. The first data latch 142 captures the gray-scale data based on the shift output from the first shift register 220 in the first shift direction shown in FIG. 8. The second data latch 144 captures the gray-scale data based on the shift output from the second shift register 230 in the second shift direction shown in FIG. 8.

In the case where the shift direction signal SHL is set at an "L" level, the gray-scale data DATA320, DATA319, . . . , DATA2, and DATA1 is sequentially supplied to the gray-scale bus 100, and distributed to the first and second divided gray-scale buses 110 and 120. The gray-scale data distribution circuit 130 outputs the even-numbered gray-scale data to the first divided gray-scale bus 110, and outputs the odd-numbered gray-scale data to the second divided gray-scale bus 120. The first data latch 142 captures the gray-scale data based on the shift outputs from the first shift register 220 in the second shift direction shown in FIG. 8. The second data latch 144 captures the gray-scale data based on the shift outputs from the second shift register 230 in the first shift direction shown in FIG. 8. Specifically, the shift directions of the first and second shift registers 220 and 230 are reversed. It is possible to deal with the change in the shift direction by reversing the supply order of the gray-scale data on the gray-scale bus 100, and changing the distribution order of the gray-scale data distribution circuit 130 by changing the shift directions of the first and second shift registers 220 and 230.

A configuration example of the gray-scale data distribution circuit 130 which distributes the gray-scale data to the first and second divided gray-scale buses 110 and 120 is described below.

Figure 11:
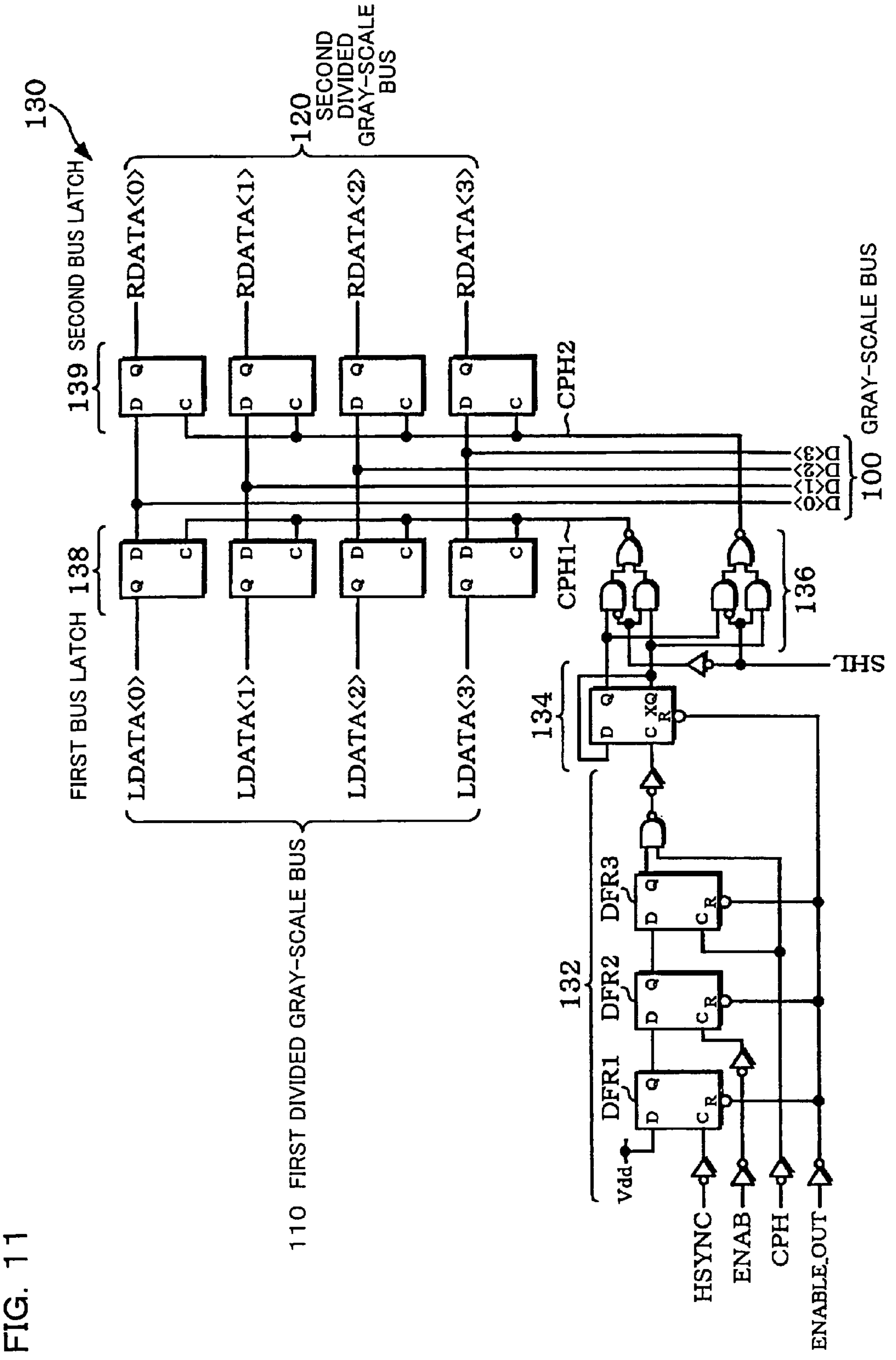
FIG. 11 is a circuit diagram of a configuration example of a gray-scale data distribution circuit in an embodiment of the present invention.

FIG. 11 shows a configuration example of the gray-scale data distribution circuit 130. FIG. 11 illustrates the case where the gray-scale bus 100 (D), the first divided gray-scale bus 110 (LDATA), and the second divided gray-scale bus 120 (RDATA) have a bus width of four bits for convenience of illustration. However, the bus width is not limited to four bits. In the case where one pixel consists of three dots and each dot consists of six bits, the gray-scale bus and the first and second divided gray-scale buses 110 and 120 have a bus width of 18 bits.

The gray-scale data distribution circuit 130 includes a sequence detection circuit 132, a frequency divider circuit 134, a capture clock generation circuit 136, and first and second bus latches 138 and 139.

The sequence detection circuit 132 is a circuit which detects a predetermined sequence after a negative-logic horizontal synchronization signal HSYNC is input. The gray-scale data distribution circuit 130 outputs the data on the gray-scale bus 100 to the first or second divided gray-scale bus 110 or 120 on condition that a predetermined sequence is detected by the sequence detection circuit 132.

In more detail, the sequence detection circuit 132 includes D flip-flops DFR1 to DFR3 which are D flip-flops (DFF) with a reset. Each D flip-flop DFR is reset when a signal input to an R terminal is set at an "L" level. A D terminal of the D flip-flop DFR1 is connected with a system power supply voltage Vdd. An inversion signal of the horizontal synchronization signal HSYNC is input to a C terminal of the D flip-flop DFR1. A Q terminal of the D flip-flop DFR1 is connected with a D terminal of the D flip-flop DFR2.

A positive-logic data start signal ENAB is input to a C terminal of the D flip-flop DFR2. The data start signal ENAB may be either the first or second shift start signal ST1 or ST2. A Q terminal of the D flip-flop DFR2 is connected with a D terminal of the D flip-flop DFR3.

An inversion signal of the reference clock signal CPH is input to a C terminal of the D flip-flop DFR3. The AND operation result of the output from the Q terminal of the D flip-flop DFR3 and the inversion signal of the reference clock signal CPH is output to the frequency divider circuit 134.

An inversion signal of an ENABLE_OUT signal is input in common to the R terminals of the D flip-flops DFR1 to DFR3. The ENABLE_OUT signal is a data start signal (ENAB) to the subsequent data driver in the case where the data drivers are cascade-connected, or a signal which indicates that the data driver is full of the captured gray-scale data.

In the sequence detection circuit 132 having the above-described configuration, the data start signal ENAB rises after the horizontal synchronization signal HSYNC has risen, and a detection signal which indicates that the reference clock signal CPH has fallen is output to the frequency divider circuit 134. Specifically, when the first gray-scale data is supplied to the gray-scale bus 100 after horizontal scanning in the horizontal scanning period has started, the sequence detection circuit 132 outputs the falling edge of the reference clock signal in synchronization with the supply timing of the gray-scale data as the detection signal.

The frequency divider circuit 134 divides the frequency of the detection signal from the sequence detection circuit 132 by two. The output from the frequency divider circuit 134 is supplied to the capture clock generation circuit 136. The frequency divider circuit 134 is formed by using a T flip-flop (TFF) to which the detection circuit is input at a C terminal.

The capture clock generation circuit 136 generates first and second capture clock signals CPH1 and CPH2 based on the output from the frequency divider circuit 134. The first capture clock signal CPH1 is supplied to a first bus latch 138. The second capture clock signal CPH2 is supplied to a second bus latch 139.

In more detail, the capture clock generation circuit 136 outputs the output from the frequency divider circuit 134 as one of the first and second capture clock signals CPH1 and CPH2 based on the shift direction signal SHL, and outputs an inversion signal of the output from the frequency divider circuit 134 as the other of the first and second capture clock signals CPH1 and CPH2. In more detail, the capture clock generation circuit 136 includes a first selector which selectively outputs the output from the frequency divider circuit 134 as either the first or second capture clock signal CPH1 or CPH2 based on the shift direction signal SHL, and a second selector which selectively outputs the inversion signal of the output from the frequency divider circuit 134 as either the first or second capture clock signal CPH1 or CPH2 based on the shift direction signal SHL. When the shift direction signal SHL is set at an "H" level (first level), the capture clock generation circuit 136 outputs the output from the frequency divider circuit 134 as the first capture clock signal CPH1, and outputs the inversion signal of the output from the frequency divider circuit 134 as the second capture clock signal CPH2. When the shift direction signal SHL is set at an "L" level (second level), the capture clock generation circuit 136 outputs the output from the frequency divider circuit 134 as the second capture clock signal CPH2, and outputs the inversion signal of the output from the frequency divider circuit 134 as the first capture clock signal CPH1.

The first and second bus latches 138 and 139 include D flip-flops DFF corresponding to each bit of the bus. The first capture clock signal CPH1 is supplied to a C terminal of each D flip-flop DFF of the first bus latch 138. The second capture clock signal CPH2 is supplied to a C terminal of each D flip-flop DFF of the second bus latch 139. A D terminal of each D flip-flop DFF of the first and second bus latches 138 and 139 is connected with the corresponding bit line of the gray-scale bus 100. A Q terminal of each D flip-flop DFF of the first bus latch 138 is connected with each bit line of the first divided gray-scale bus 110. A Q terminal of each D flip-flop DFF of the second bus latch 139 is connected with each bit line of the second divided gray-scale bus 120.

Figure 12:
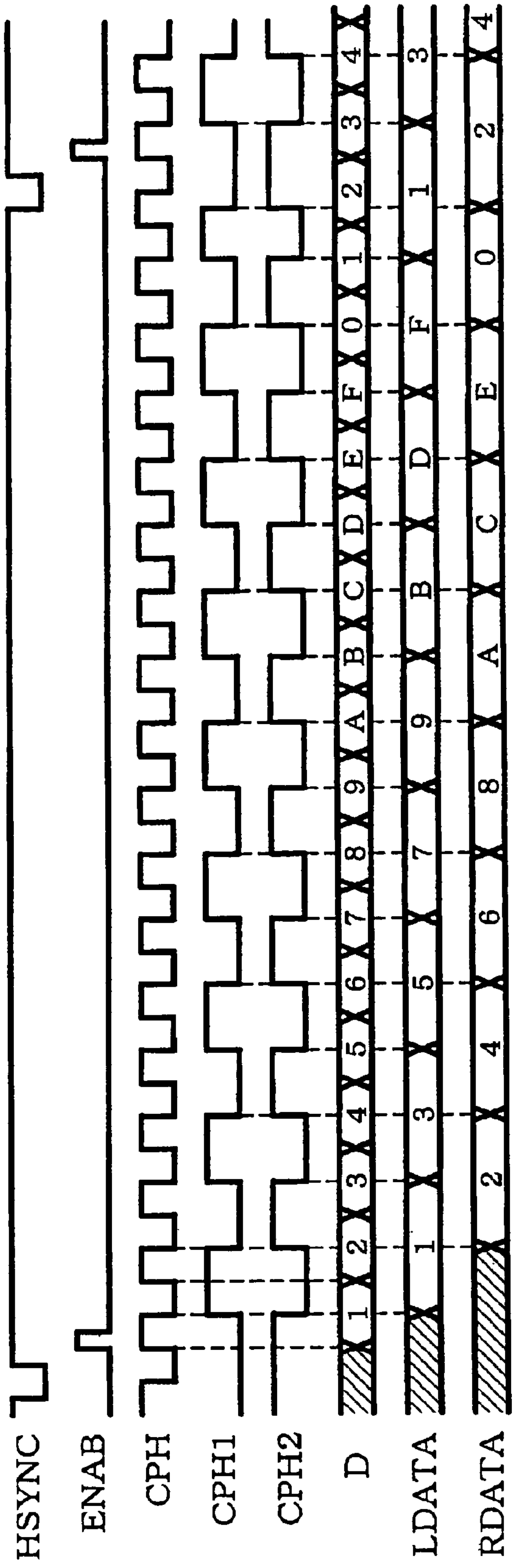
FIG. 12 is a timing diagram of an operation example of the gray-scale data distribution circuit shown in FIG. 11.

FIG. 12 shows a timing diagram of an operation example of the gray-scale data distribution circuit 130 shown in FIG. 11. FIG. 12 illustrates the case where the shift direction signal SHL is set at an "H" level.

The gray-scale data is supplied to the gray-scale bus 100 corresponding to the arrangement order of the data lines DL1 to DLN of the LCD panel 20. In FIG. 12, the gray-scale data corresponding to the data line DL1 is illustrated as DATA1 ("1" in FIG. 12), and the gray-scale data corresponding to the data line DL2 is illustrated as DATA2 ("2" in FIG. 12). The gray-scale data is supplied to the gray-scale bus 100 (D) in synchronization with the reference clock signal CPH.

When the horizontal synchronization signal HSYNC is set at the "L" level and horizontal scanning starts, the sequence detection circuit 132 performs the above-described sequence detection. Specifically, the data start signal ENAB rises after the horizontal synchronization signal HSYNC has risen, and a detection signal which indicates that the reference clock signal CPH has fallen is output to the frequency divider circuit 134. The frequency divider circuit 134 divides the frequency of the detection signal by two.

Since the shift direction signal SHL is set at the "H" level, the capture clock generation circuit 136 outputs the output from the frequency divider circuit 134 as the first capture clock signal CPH1, and outputs the inversion signal of the output from the frequency divider circuit 134 as the second capture clock signal CPH2. The first bus latch 138 captures the gray-scale data on the gray-scale bus 100 when the first capture clock signal CPH1 is set at the "H" level. The second bus latch 138 captures the gray-scale data on the gray-scale bus 100 when the second capture clock signal CPH2 is set at the "H" level. As a result, the first bus latch 138 captures the odd-numbered gray-scale data and outputs the captured gray-scale data as LDATA, as shown in FIG. 12. The second bus latch 139 captures the even-numbered gray-scale data, and outputs the captured gray-scale data as RDATA.

As described above, the gray-scale data distribution circuit 130 is capable of alternately outputting the gray-scale data on the gray-scale bus 100 to the first and second divided gray-scale buses 110 and 120.

An operation example of the data latch 200 of the data driver 30 is described below.

In the data latch 200 shown in FIG. 8, it is preferable that the first and second shift start signals ST1 and ST2 be signals having the same phase. This is because it is necessary to separately generate the first and second shift start signals ST1 and ST2.

If the first and second shift start signals ST1 and ST2 are signals having the same phase, it is necessary to generate the first and second shift clock signals CLK1 and CLK2 for capturing the first and second shift start signals ST1 and ST2 in the first stages of the first and second shift registers 220 and 230, respectively. Therefore, it is preferable that the data driver 30 include a shift clock generation circuit as described below.

Figure 13:
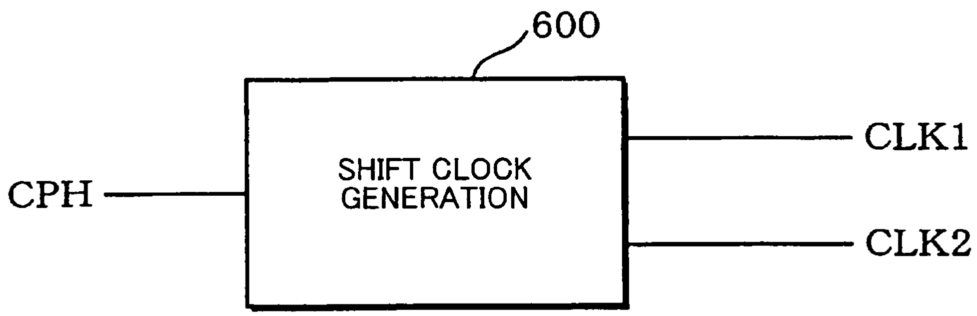
FIG. 13 is a configuration diagram of a shift clock generation circuit.

FIG. 13 shows an outline of a configuration of a shift clock generation circuit.

A shift clock generation circuit 600 generates the first and second shift clock signals CLK1 and CLK2 based on the reference clock signal CPH with which the gray-scale data is supplied in synchronization. The shift clock generation circuit 600 generates the first and second shift clock signals CLK1 and CLK2 so that the first and second shift clock signals CLK1 and CLK2 include a period in which the phases of the first and second shift clock signals CLK1 and CLK2 are reversed.

The first and second shift start signals ST1 and ST2 become signals having the same phase by generating the first and second shift clock signals CLK1 and CLK2 in this manner, whereby the configuration and control can be simplified.

Figure 14:
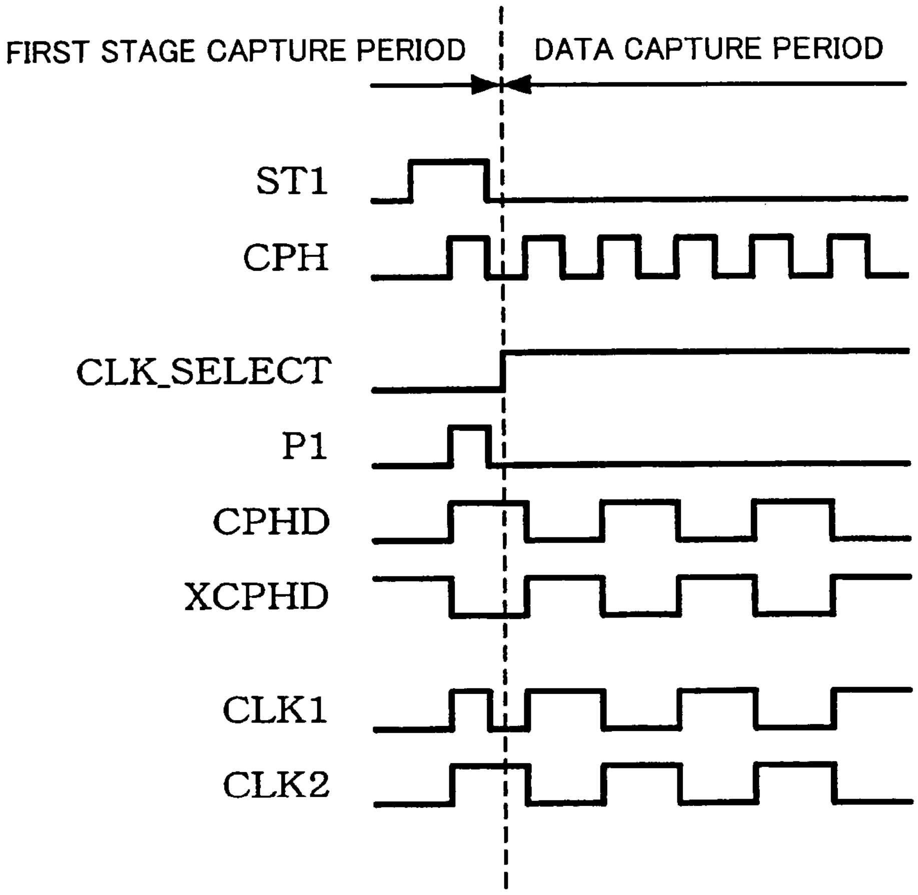
FIG. 14 is a timing diagram showing an example of generation timing of first and second shift clock signals by a shift clock generation circuit.

FIG. 14 shows an example of generation timing of the first and second shift clock signals CLK1 and CLK2 by the shift clock generation circuit 600.

The shift clock generation circuit 600 generates a clock select signal CLK_SELECT which specifies the first stage capture period and the data capture period (shift operation period). The first stage capture period may be referred to as a period in which the first shift start signal ST1 is captured in the first shift register 220, or a period in which the second shift start signal ST2 is captured in the second shift register 230. The data capture period may be referred to as a period in which the shift start signal captured in the first stage capture period is shifted after the first stage capture period has elapsed.

The first and second shift clock signals CLK1 and CLK2 are provided with edges for capturing the first and second shift start signals ST1 and ST2 by using the clock select signal CLK_SELECT.

Therefore, a pulse P1 of the reference clock signal CPH is generated in the first stage capture period. A frequency-divided clock signal CPHD is generated by dividing the frequency of the reference clock signal CPH. The frequency-divided clock signal CPHD becomes the second shift clock signal CLK2. An inverted frequency-divided clock signal XCPHD is generated by reversing the phase of the frequency-divided clock signal CPHD.

The first shift clock signal CLK1 is generated by selectively outputting the pulse P1 of the reference clock signal CPH in the first stage capture period and selectively outputting the inverted frequency-divided clock signal XCPHD in the data capture period by using the clock select signal CLK_SELECT.

Figure 15:
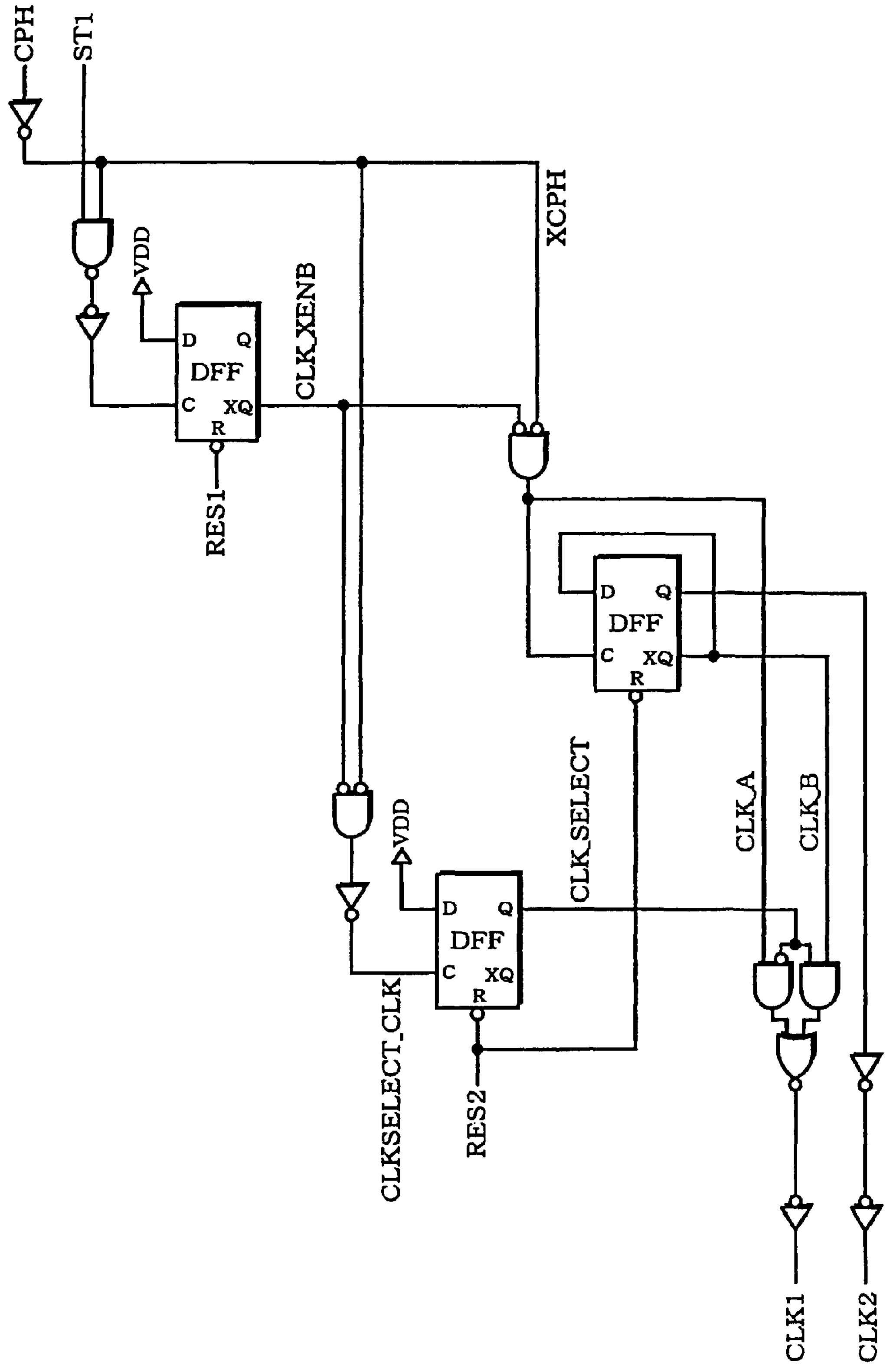
FIG. 15 is a circuit diagram showing a configuration example of a shift clock generation circuit.

FIG. 15 shows a circuit diagram which is a specific configuration example of the shift clock generation circuit 600.

Figure 16:
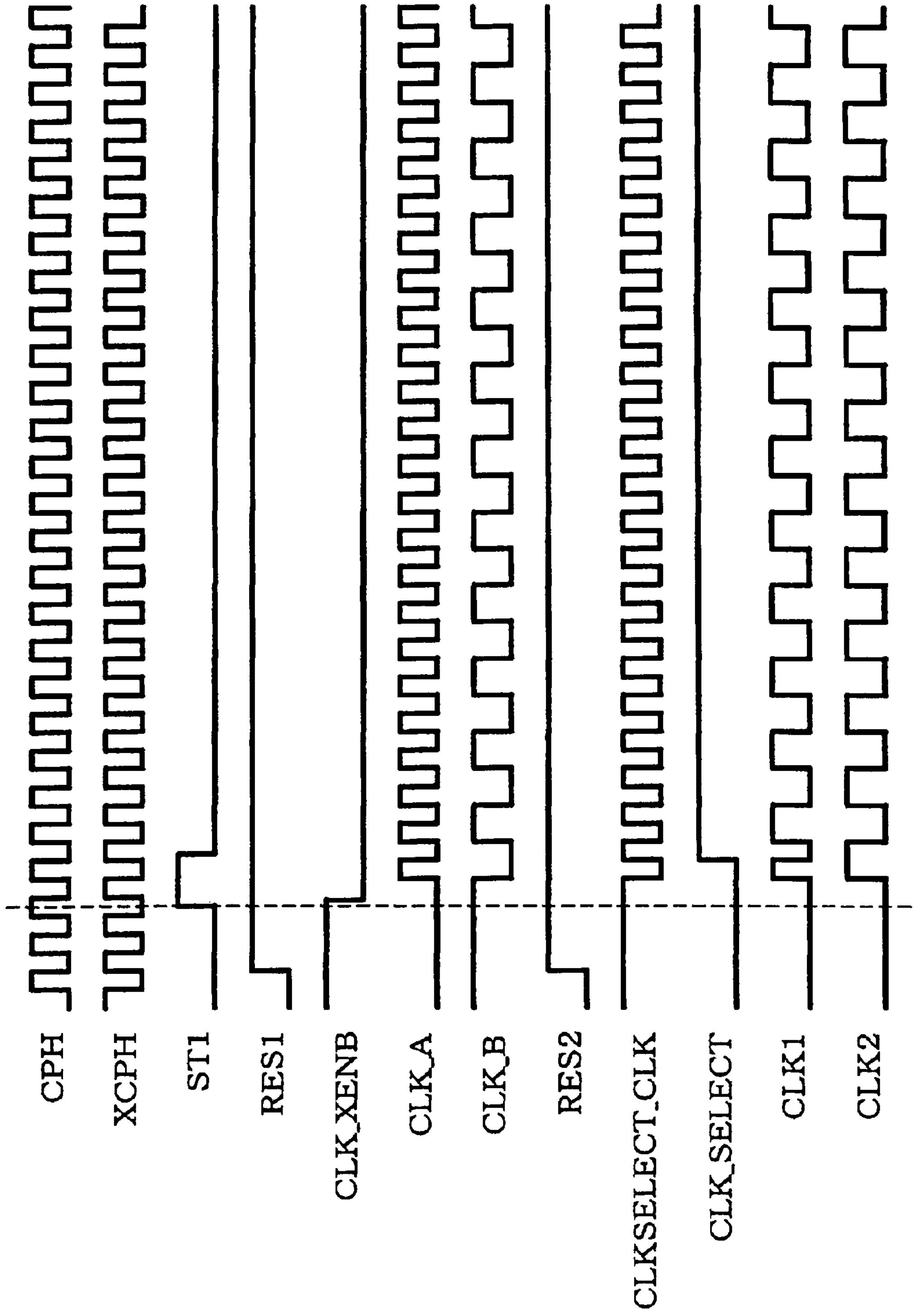
FIG. 16 is a timing diagram of an operation example of the shift clock generation circuit shown in FIG. 15.

FIG. 16 shows an example of operation timing of the shift clock generation circuit 600 shown in FIG. 15.

In FIGS. 15 and 16, clock signals CLK_A and CLK_B are generated by using the reference clock signal CPH, and selectively output by using the clock select signal CLK_SELECT. The second shift clock signal CLK2 is a signal generated by reversing the clock signal CLK_B. The first shift clock signal CLK1 is a signal generated by selectively outputting the clock signal CLK_A in the first stage capture period in which the clock select signal CLK_SELECT is set at the "L" level, and selectively outputting the clock signal CLK_B in the data capture period in which the clock select signal CLK_SELECT is set at the "H" level.

The data latch 200 of the data driver 30 operates as described below by using the first and second shift start signals ST1 and ST2 and the first and second shift clock signals CLK1 and CLK2.

Figure 17:
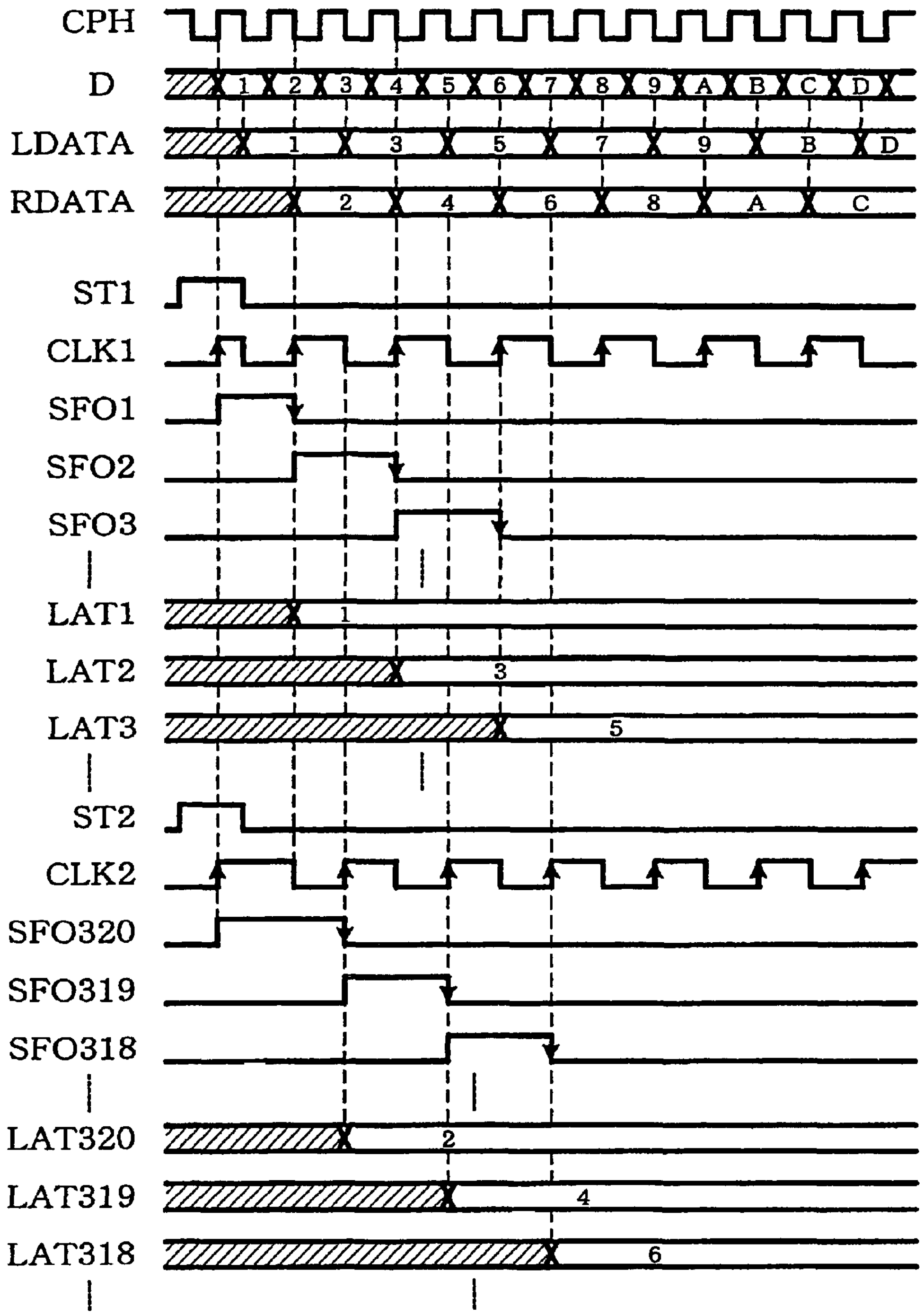
FIG. 17 is a timing diagram showing an example of an operation of a data latch of a data driver in an embodiment of the present invention.

FIG. 17 shows an example of operation timing of the data latch 200 of the data driver 30.

FIG. 17 shows an example in which the shift direction signal SHL is set at the "H" level and the gray-scale data is distributed to the first and second divided gray-scale buses 110 and 120 as shown in FIG. 12.

The first shift register 220 shifts the first shift start signal ST1 in synchronization with the rising edge of the first shift clock signal CLK1. As a result, the first shift register 220 outputs the shift outputs SFO1 to SFO160 in that order.

The second shift register 230 shifts the second shift start signal ST2 in synchronization with the rising edge of the second shift clock signal CLK2 during the shift operation of the first shift register 220. As a result, the second shift register 230 outputs the shift outputs SFO320 to SFO161 in that order.

The first data latch 142 captures the gray-scale data on the first divided gray-scale bus 110 at the falling edge of each shift output from the first shift register 220. As a result, the first data latch 142 captures the gray-scale data DATA1 at the falling edge of the shift output SFO1, captures the gray-scale data DATA3 at the falling edge of the shift output SFO2, and captures the gray-scale data DATA5 at the falling edge of the shift output SFO3.

The second data latch 144 captures the gray-scale data on the second divided gray-scale bus 120 at the falling edge of each shift output from the second shift register 230. As a result, the second data latch 144 captures the gray-scale data DATA2 at the falling edge of the shift output SFO320, captures the gray-scale data DATA4 at the falling edge of the shift output SFO319, and captures the gray-scale data DATA6 at the falling edge of the shift output SFO318.

This enables the gray-scale data to be captured after data scrambling (see FIG. 5) corresponding to the data lines of the comb-tooth distributed LCD panel 20. Therefore, the gray-scale data DATA1 to DATA320 is supplied to the corresponding data lines DL1 to DL320 of the LCD panel 20 shown in FIG. 1 or 4, whereby a correct image can be displayed. Moreover, the bus frequencies of the first and second divided gray-scale buses 110 and 120 can be reduced, whereby power consumption can be reduced.

The present invention is not limited to the above-described embodiment. Various modifications and variations are possible within the spirit and scope of the present invention. The above embodiment is described taking an active matrix type liquid crystal panel in which each pixel of the display panel includes a TFT as an example. However, the present invention is not limited thereto. The present invention may also be applied to a passive matrix type liquid crystal display. The present invention may be applied to a plasma display device in addition to a liquid crystal panel, for example.

In the case of forming one pixel using three dots, the present invention can be realized in the same manner as described above by replacing the data line with a set of three color component data lines.

Part of requirements of any claim of the present invention could be omitted from a dependent claim which depends on that claim. Moreover, part of requirements of any independent claim of the present invention could be made to depend on any other independent claim.

One embodiment of the present invention provide a data driver which drives a plurality of data lines of an electro-optical device which includes a plurality of scan lines, the data lines and a plurality of pixels, the data lines being comb-tooth distributed in units of a predetermined number of the data lines, the data driver including:

first and second divided gray-scale buses;

a gray-scale bus to which gray-scale data is supplied corresponding to an arrangement order of each of the data lines;

a gray-scale data distribution circuit which distributes and outputs the gray-scale data supplied to the gray-scale bus to the first and second divided gray-scale buses;

a first driver circuit which drives the data lines belonging to a first group among the data lines based on the gray-scale data output to the first divided gray-scale bus by the gray-scale data distribution circuit; and a second driver circuit which drives the data lines belonging to a second group among the data lines based on the gray-scale data output to the second divided gray-scale bus by the gray-scale data distribution circuit, wherein the gray-scale data distribution circuit alternately outputs the gray-scale data supplied to the gray-scale bus to the first and second divided gray-scale buses in units of the gray-scale data for the predetermined number of data lines.

In this embodiment, the data driver drives the comb-tooth distributed data lines. The data lines are comb-tooth distributed in units of the data lines for one pixel. The gray-scale data supplied to the gray-scale bus is alternately distributed and output to the first and second divided gray-scale buses in the arrangement order of the data lines by using the gray-scale data distribution circuit. The gray-scale data distribution circuit alternately distributes the gray-scale data in units of the gray-scale data for one pixel, for example. Therefore, the arrangement order of the gray-scale data can be changed and a correct image can be displayed by allowing the first driver circuit to drive the data lines based on the gray-scale data output to the first divided gray-scale bus and the second driver circuit to drive the data lines based on the gray-scale data output to the second divided gray-scale bus. Since the interconnect length of the gray-scale bus with a high bus frequency can be reduced by allowing the gray-scale data to be sequentially changed, drive capability of a buffer which drives the gray-scale bus can be reduced, whereby power consumption can be reduced.

With this data driver, the gray-scale data distribution circuit may include:

a first bus latch which holds the gray-scale data on the gray-scale bus based on a first capture clock signal, and outputs the held gray-scale data to the first divided gray-scale bus; and a second bus latch which holds the gray-scale data on the gray-scale bus based on a second capture clock signal, and outputs the held gray-scale data to the second divided gray-scale bus.

According to this feature, since the gray-scale data on the first and second divided gray-scale buses is held, the bus frequencies of the first and second divided gray-scale buses can be made approximately half of the bus frequency of the gray-scale bus. Therefore, power consumption can be further reduced by reducing a shoot-through current due to reduction of the bus frequency.

This data driver may include a frequency divider circuit which divides a frequency of a clock signal for capturing the gray-scale data, and a capture clock generation circuit which generates the first and second capture clock signals based on output from the frequency divider circuit.

With this data driver, the capture clock generation circuit may output the output from the frequency divider circuit as the first capture clock signal to the first bus latch and may output an inversion signal of the output from the frequency divider circuit as the second capture clock signal to the second bus latch when a shift direction signal is set at a first level, and may output the output from the frequency divider circuit as the second capture clock signal to the second bus latch and may output the inversion signal of the output from the frequency divider circuit as the first capture clock signal to the first bus latch when the shift direction signal is set at a second level.

According to these features, distribution of the gray-scale data by the gray-scale data distribution circuit can be realized by using a simple configuration.

This data driver may include:

a first shift register which includes a plurality of flip-flops, shifts a first shift start signal in a first shift direction based on a first shift clock signal, and outputs a shift output from each of the flip-flops;

a second shift register which includes a plurality of flip-flops, shifts a second shift start signal in a second shift direction based on a second shift clock signal, and outputs a shift output from each of the flip-flops, the second shift direction being a direction opposite to the first direction;

a first data latch which includes a plurality of flip-flops, each of the flip-flops holding the gray-scale data for the predetermined number of data lines that has been output to the first divided gray-scale bus, based on the shift output from the first shift register; and a second data latch which includes a plurality of flip-flops, each of the flip-flops holding the gray-scale data for the predetermined number of data lines that has been output to the second divided gray-scale bus, based on the shift output from the second shift register, the first driver circuit may include a plurality of data output sections, each of the data output sections driving one of the data lines based on the gray-scale data held by the flip-flop of the first data latch, and the second driver circuit may include a plurality of data output sections, each of the data output sections driving one of the data lines based on the gray-scale data held by the flip-flop of the second data latch.

In this feature, the shift direction of the first shift register and the shift direction of the second shift register may be opposite directions. Since the gray-scale data on the first and second divided gray-scale buses, to which the gray-scale data is alternately output, can be captured based on different shift clock signals of first and second shift clock signals, the configuration of the data driver which drives the comb-tooth distributed data lines can be simplified, and power consumption can be reduced.

With this data driver, a direction from a first side to a second side of the electro-optical device, in which the data lines extend, may be the same as the first or second shift direction.

With this data driver, when the scan lines extend along a long side of the electro-optical device and the data lines extend along a short side of the electro-optical device, the data driver may be disposed along the short side.

According to these features, the mounting area of the comb-tooth distributed electro-optical device can be reduced as the number of data lines increases.

Another embodiment of the present invention provide an electro-optical device including:

a plurality of scan lines;

a plurality of data lines which are comb-tooth distributed in units of a predetermined number of the data lines;

a plurality of pixels;

the above-described data driver which drives the data lines; and a scan driver which scans the scan lines.

A further embodiment of the present invention provide an electro-optical device including:

a display panel which includes a plurality of scan lines, a plurality of data lines which are comb-tooth distributed in units of a predetermined number of the data lines; and a plurality of pixels;

the above-described data driver which drives the data lines; and a scan driver which scans the scan lines.

According to these embodiments, an electro-optical device which can be readily mounted on an electronic instrument can be provided by reducing the mounting area.

What is claimed is:

1. A driver which drives a device comprising:

a first bus;

a second bus;

a third bus which supplies data to the first bus and the second bus;

a first driver circuit which outputs a plurality of first signals based on data of the first bus to a first part of the device; and a second driver circuit which outputs a plurality of second signals based on data of the second bus to a second part of the device.

2. A data driver which drives a plurality of data lines of an electro-optical device which includes a plurality of scan lines, a plurality of data lines, and a plurality of pixels, the data driver comprising:

a first bus;

a second bus;

a third bus to which gray-scale data being supplied;

a gray-scale data distribution circuit which distributes the gray-scale data to the first bus and the second bus;

a first driver circuit which outputs a plurality of first signals based on data of the first bus to data lines belonging to a first group among the data lines; and a second driver circuit which outputs a plurality of second signals based on data of the second bus to data lines belonging to a second group among the data lines.

3. The data driver as defined in claim 2, wherein the gray-scale data distribution circuit includes:

a first bus latch which holds the gray-scale data on the third bus based on a first capture clock signal, and outputs the held gray-scale data to the first bus; and a second bus latch which holds the gray-scale data on the third bus based on a second capture clock signal, and outputs the held gray-scale data to the second bus.

4. The data driver as defined in claim 3, comprising:

a frequency divider circuit which divides a frequency of a clock signal for capturing the gray-scale data; and a capture clock generation circuit which generates the first and second capture clock signals based on output from the frequency divider circuit.

5. The data driver as defined in claim 4, wherein the capture clock generation circuit outputs the output from the frequency divider circuit as the first capture clock signal to the first bus latch and outputs an inversion signal of the output from the frequency divider circuit as the second capture clock signal to the second bus latch when a shift direction signal is set at a first level, and outputs the output from the frequency divider circuit as the second capture clock signal to the second bus latch and outputs the inversion signal of the output from the frequency divider circuit as the first capture clock signal to the first bus latch when the shift direction signal is set at a second level.

6. The data driver as defined in claim 2, comprising:

a first shift register which includes a plurality of flip-flops, shifts a first shift start signal in a first shift direction based on a first shift clock signal, and outputs a shift output from each of the flip-flops;

a second shift register which includes a plurality of flip-flops, shifts a second shift start signal in a second shift direction based on a second shift clock signal, and outputs a shift output from each of the flip-flops, the second shift direction being a direction opposite to the first direction;

a first data latch which includes a plurality of flip-flops, each of the flip-flops holding the gray-scale data for the data lines that has been output to the first bus, based on the shift output from the first shift register; and a second data latch which includes a plurality of flip-flops, each of the flip-flops holding the gray-scale data for the data lines that has been output to the second bus, based on the shift output from the second shift register, wherein the first driver circuit includes a plurality of data output sections, each of the data output sections driving one of the data lines based on the gray-scale data held by the flip-flop of the first data latch, and wherein the second driver circuit includes a plurality of data output sections, each of the data output sections driving one of the data lines based on the gray-scale data held by the flip-flop of the second data latch.

7. The data driver as defined in claim 3, comprising:

a first shift register which includes a plurality of flip-flops, shifts a first shift start signal in a first shift direction based on a first shift clock signal, and outputs a shift output from each of the flip-flops;

a second shift register which includes a plurality of flip-flops, shifts a second shift start signal in a second shift direction based on a second shift clock signal, and outputs a shift output from each of the flip-flops, the second shift direction being a direction opposite to the first direction;

a first data latch which includes a plurality of flip-flops, each of the flip-flops holding the gray-scale data for the data lines that has been output to the first bus, based on the shift output from the first shift register; and a second data latch which includes a plurality of flip-flops, each of the flip-flops holding the gray-scale data output to the second bus and corresponding to the data lines based on the shift output from the second shift register, wherein the first driver circuit includes a plurality of data output sections, each of the data output sections driving one of the data lines based on the gray-scale data held by the flip-flop of the first data latch, and wherein the second driver circuit includes a plurality of data output sections, each of the data output sections driving one of the data lines based on the gray-scale data held by the flip-flop of the second data latch.

8. The data driver as defined in claim 4, comprising:

a first shift register which includes a plurality of flip-flops, shifts a first shift start signal in a first shift direction based on a first shift clock signal, and outputs a shift output from each of the flip-flops;

a second shift register which includes a plurality of flip-flops, shifts a second shift start signal in a second shift direction based on a second shift clock signal, and outputs a shift output from each of the flip-flops, the second shift direction being a direction opposite to the first direction;

a first data latch which includes a plurality of flip-flops, each of the flip-flops holding the gray-scale data for the data lines that has been output to the first bus, based on the shift output from the first shift register; and a second data latch which includes a plurality of flip-flops, each of the flip-flops holding the gray-scale data output to the second bus and corresponding to the data lines based on the shift output from the second shift register, wherein the first driver circuit includes a plurality of data output sections, each of the data output sections driving one of the data lines based on the gray-scale data held by the flip-flop of the first data latch, and wherein the second driver circuit includes a plurality of data output sections, each of the data output sections driving one of the data lines based on the gray-scale data held by the flip-flop of the second data latch.

9. The data driver as defined in claim 5, comprising:

a first shift register which includes a plurality of flip-flops, shifts a first shift start signal in a first shift direction based on a first shift clock signal, and outputs a shift output from each of the flip-flops;

a second shift register which includes a plurality of flip-flops, shifts a second shift start signal in a second shift direction based on a second shift clock signal, and outputs a shift output from each of the flip-flops, the second shift direction being a direction opposite to the first direction;

a first data latch which includes a plurality of flip-flops, each of the flip-flops holding the gray-scale data for the data lines that has been output to the first bus, based on the shift output from the first shift register; and a second data latch which includes a plurality of flip-flops, each of the flip-flops holding the gray-scale data output to the second us and corresponding to the data lines based on the shift output from the second shift register, wherein the first driver circuit includes a plurality of data output sections, each of the data output sections driving one of the data lines based on the gray-scale data held by the flip-flop of the first data latch, and wherein the second driver circuit includes a plurality of data output sections, each of the data output sections driving one of the data lines based on the gray-scale data held by the flip-flop of the second data latch.

10. The data driver as defined in claim 6, wherein a direction from a first side to a second side of the electro-optical device, in which the data lines extend, is the same as the first or second shift direction.

11. The data driver as defined in claim 2, wherein, when the scan lines extend along a long side of the electro-optical device and the data lines extend along a short side of the electro-optical device, the data driver is disposed along the short side.

12. The data driver as defined in claim 3, wherein, when the scan lines extend along a long side of the electro-optical device and the data lines extend along a short side of the electro-optical device, the data driver is disposed along the short side.

13. The data driver as defined in claim 4, wherein, when the scan lines extend along a long side of the electro-optical device and the data lines extend along a short side of the electro-optical device, the data driver is disposed along the short side.

14. The data driver as defined in claim 5, wherein, when the scan lines extend along a long side of the electro-optical device and the data lines extend along a short side of the electro-optical device, the data driver is disposed along the short side.

15. The data driver as defined in claim 6, wherein, when the scan lines extend along a long side of the electro-optical device and the data lines extend along a short side of the electro-optical device, the data driver is disposed along the short side.

16. The data driver as defined in claim 10, wherein, when the scan lines extend along a long side of the electro-optical device and the data lines extend along a short side of the electro-optical device, the data driver is disposed along the short side.

17. An electro-optical device comprising:

a plurality of scan lines;

a plurality of data lines;

a plurality of pixels;

the data driver as defined in claim 1 which drives the data lines; and a scan driver which scans the scan lines.

* * * * *